(12) United States Patent
Jalili

(10) Patent No.: US 11,532,012 B2
(45) Date of Patent: *Dec. 20, 2022

(54) CUSTOMIZING RESOURCES UTILIZING PRE-FETCHED PROFILE INFORMATION FOR FUTURE VISITORS

(71) Applicant: Adobe Inc., San Jose, CA (US)

(72) Inventor: Reza Jalili, Sandy, UT (US)

(73) Assignee: Adobe Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/123,960

(22) Filed: Dec. 16, 2020

(65) Prior Publication Data
US 2021/0103951 A1  Apr. 8, 2021

Related U.S. Application Data

(60) Division of application No. 16/192,490, filed on Nov. 15, 2018, which is a continuation of application No. 14/275,547, filed on May 12, 2014, now Pat. No. 10,169,776.

(51) Int. Cl.
*G06Q 30/02* (2012.01)
*H04W 4/029* (2018.01)
*H04L 67/5681* (2022.01)

(52) U.S. Cl.
CPC ..... *G06Q 30/0241* (2013.01); *G06Q 30/0269* (2013.01); *G06Q 30/0271* (2013.01); *G06Q 30/0277* (2013.01); *H04L 67/5681* (2022.05); *H04W 4/029* (2018.02)

(58) Field of Classification Search
CPC ....................................... G06Q 30/0207–0277
See application file for complete search history.

(56) References Cited

U.S. PATENT DOCUMENTS

| | | | |
|---|---|---|---|
| 6,298,330 B1 * | 10/2001 | Gardenswartz | G06Q 30/02 705/14.35 |
| 9,390,181 B1 * | 7/2016 | Kotas | G06Q 30/0277 |
| 9,740,794 B2 * | 8/2017 | Bhumkar | G06F 16/9038 |
| 9,952,738 B1 * | 4/2018 | Kumar | G06F 9/451 |
| 10,169,776 B2 | 1/2019 | Jalili | |

(Continued)

OTHER PUBLICATIONS

U.S. Appl. No. 14/275,547, filed Dec. 21, 2016, Preinterview 1st Office Action.

(Continued)

*Primary Examiner* — Kiersten V Summers
(74) *Attorney, Agent, or Firm* — Keller Preece PLLC

(57) ABSTRACT

Methods described herein include prefetching information for a future visitor to a webpage or other resource. Prefetching the information can allow a provider to customize the webpage or resource with reduced latency. The methods can include notifying an experience provider associated with an advertisement prior to the user requesting the webpage or other resource. The notification can provide identification information corresponding to the client device or user. The notification also indicates that the client device or a user is about to be directed to the webpage or other resource. The notification can allow for retrieval of profile information associated with the identification information prior to the direction of the client device to the webpage or other resource.

20 Claims, 12 Drawing Sheets

(56) References Cited

U.S. PATENT DOCUMENTS

| | | | |
|---|---|---|---|
| 2002/0091570 A1* | 7/2002 | Sakagawa | G06Q 30/0208 709/238 |
| 2005/0071252 A1 | 3/2005 | Henning et al. | |
| 2006/0069617 A1* | 3/2006 | Milener | G06Q 20/145 705/14.69 |
| 2006/0143568 A1* | 6/2006 | Milener | G06F 16/957 715/764 |
| 2007/0294401 A1* | 12/2007 | Shkedi | G06Q 30/0269 709/224 |
| 2008/0235749 A1 | 9/2008 | Jain et al. | |
| 2008/0306816 A1* | 12/2008 | Matthys | G06Q 30/0273 705/14.69 |
| 2010/0082808 A1 | 4/2010 | Vaynblat et al. | |
| 2010/0095220 A1* | 4/2010 | Kassab | G06Q 30/02 715/745 |
| 2011/0029899 A1* | 2/2011 | Fainberg | G06F 12/0862 715/806 |
| 2011/0041168 A1 | 2/2011 | Murray et al. | |
| 2011/0093790 A1* | 4/2011 | Maczuba | G06F 16/9574 715/745 |
| 2011/0099037 A1 | 4/2011 | Levin et al. | |
| 2011/0238921 A1* | 9/2011 | Allen | G06F 12/0862 711/E12.017 |
| 2011/0251896 A1* | 10/2011 | Impollonia | H04N 21/84 705/14.55 |
| 2011/0276585 A1 | 11/2011 | Wagner et al. | |
| 2012/0047445 A1* | 2/2012 | Rajagopal | G06F 16/9574 715/747 |
| 2012/0095834 A1 | 4/2012 | Doig et al. | |
| 2013/0325611 A1* | 12/2013 | Delug | G06Q 30/0257 705/14.55 |
| 2014/0195626 A1 | 7/2014 | Ruff et al. | |
| 2017/0163759 A1* | 6/2017 | Acharya | H04L 67/01 |
| 2019/0087851 A1 | 3/2019 | Jalili | |

OTHER PUBLICATIONS

U.S. Appl. No. 14/275,547, filed Apr. 26, 2017, Office Action.
U.S. Appl. No. 14/275,547, filed Sep. 27, 2018, Notice of Allowance.
U.S. Appl. No. 16/192,490, filed Oct. 9, 2020, Preinterview 1st Office Action.
U.S. Appl. No. 16/192,490, filed Nov. 3, 2020, Notice of Allowance.

* cited by examiner

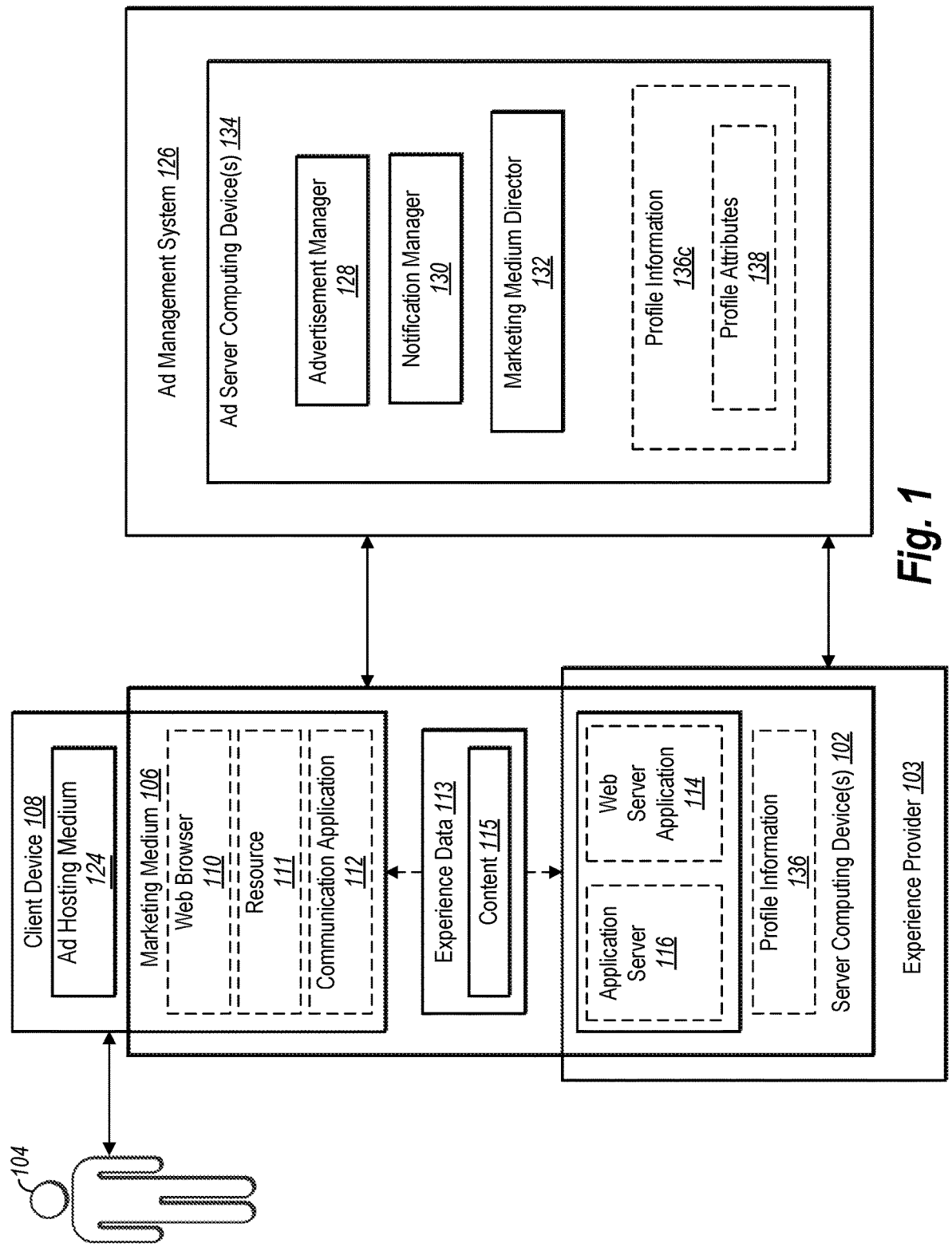

CUSTOMIZING RESOURCES UTILIZING PRE-FETCHED PROFILE INFORMATION FOR FUTURE VISITORS

CROSS REFERENCE TO RELATED APPLICATIONS

The present application is a division of U.S. application Ser. No. 16/192,490, filed Nov. 15, 2018, which is a continuation of U.S. application Ser. No. 14/275,547, filed May 12, 2014, now issued as U.S. Pat. No. 10,169,776. The aforementioned applications are hereby incorporated by reference in their entirety.

BACKGROUND

1. Technical Field

One or more embodiments of the present invention relate generally to systems and methods for obtaining information about visitors to a marketing medium. More specifically, one or more embodiments of the present invention relate to systems and methods of sending a notification that a user is about to be directed to resource (e.g., a website). Based on the notification, profile information can be obtained for the user prior to the user arriving at the resource.

2. Background and Relevant Art

Due to ever-increasing use of Internet-enabled devices, advertisers often seek to advertise on such devices. Many websites, native applications, or other Internet-enabled marketing mediums display advertisements from an ad server. Ad servers typically provide different ads across one or more marketing mediums to users based on the amount of advertising space, click, or impressions purchased by advertisers.

When a user clicks on an advertisement served via an ad server, the ad server can redirect the user to a web page associated with the specific advertiser. The time from when a user clicks the advertisement until the web page is rendered on the user's device can take several seconds. Conventionally, the first time the advertiser is aware that a user want to access a web page is when the web server receives a request from the user for the web page. Because of this, if the web server desires to personalize or otherwise customize the requested web page, the web server must do so after the user has requested the web page. Thus, traditionally customizing a web page for a user adds latency to the process of providing the web page.

While customized content can potentially be helpful in converting a higher percentage of advertisement clicks to purchases, customizing the web page can increase the time between clicking the advertisement and viewing the content associated with the advertisement. The increased time can frustrate user and possibly result in a higher bounce rate.

Additionally, when an advertiser receives a redirect, the advertiser may desire to retrieve profile information for the user in order to present customized data. Often times such profile information is stored in a remote data storage location. For example, a server storing the profile information may be located in a first city or country, while the server that will provide the customized content may be in a second remote city or country. In such cases, retrieving profile information stored in a remote data storage location and delivering the profile information to the server that will provide the customized content can be time consuming and add further latency to the process.

While providing content customized to particular users can increase conversion rates, many experience providers lack the resources to track users and store profile information. For example, some newer experience providers do not have enough traffic to accumulate a meaningful amount of data. Still other experience providers lack the backend infrastructure to support the user profile storage, tracking, and information retrieval.

These and other disadvantages may exist with respect to conventional advertising processes.

SUMMARY

One or more embodiments of the present invention provide benefits and/or solve one or more of the foregoing or other problems in the art with systems and methods for obtaining information for future visitors. For example, one or more embodiments involve sending a notification that a user is about to be directed to a resource hosted by an experience provider. For example, when a user clicks on an advertisement, an ad server can send a notification to the experience provider that the user is going to be directed to a resource associated with the advertisement. The ad server can send the notification so that the experience provider receives the notification prior to the user requesting the resource. The notification can allow the experience provider to prepare the resource for the user before the user arrives at the resource. Thus, the notification can allow the experience provider to reduce latency by preparing for the user to visit the resource before the user requests the resource.

For example, upon receiving a notification that a user is about to, or is likely to, request or visit a resource, the experience provider can retrieve profile information for the user from a remote storage and store the profile information in a more accessible location. Storing the profile information in a more accessible location can allow the experience provider to quickly retrieve and use the profile information once the user reaches the resource. Thus, one or more embodiments of the present invention can reduce latency and otherwise provide a more effective user experience.

The methods and systems disclosed herein can provide improvements in customizing experiences by reducing the time between a user selecting an advertisement and being presented with a resource with a customized experience for the user. In particular, prefetching user profile before the user is directed to a resource can allow the experience provider to customize an experience for the user before the user reaches the resource. Upon the user arriving at the resource, the commerce application can provide the customized experience for the user. As such, one or more embodiments can provide a customized experience without adding latency or while reducing processing times.

Still further embodiments include providing profile information in connection with the notification. For example, the notification can include profile information regarding a user that is about to be directed to a resource associated with an experience provider. The experience provider can then use the profile information to customize the resource for the user. One will appreciate that such embodiments can allow experience providers without backend infrastructure or accumulated data to provide a customized experience.

Additional features and advantages of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 1 illustrates a schematic overview of an information retrieval system in accordance with one or more embodiments of the present invention;

DETAILED DESCRIPTION

Figure 2A:
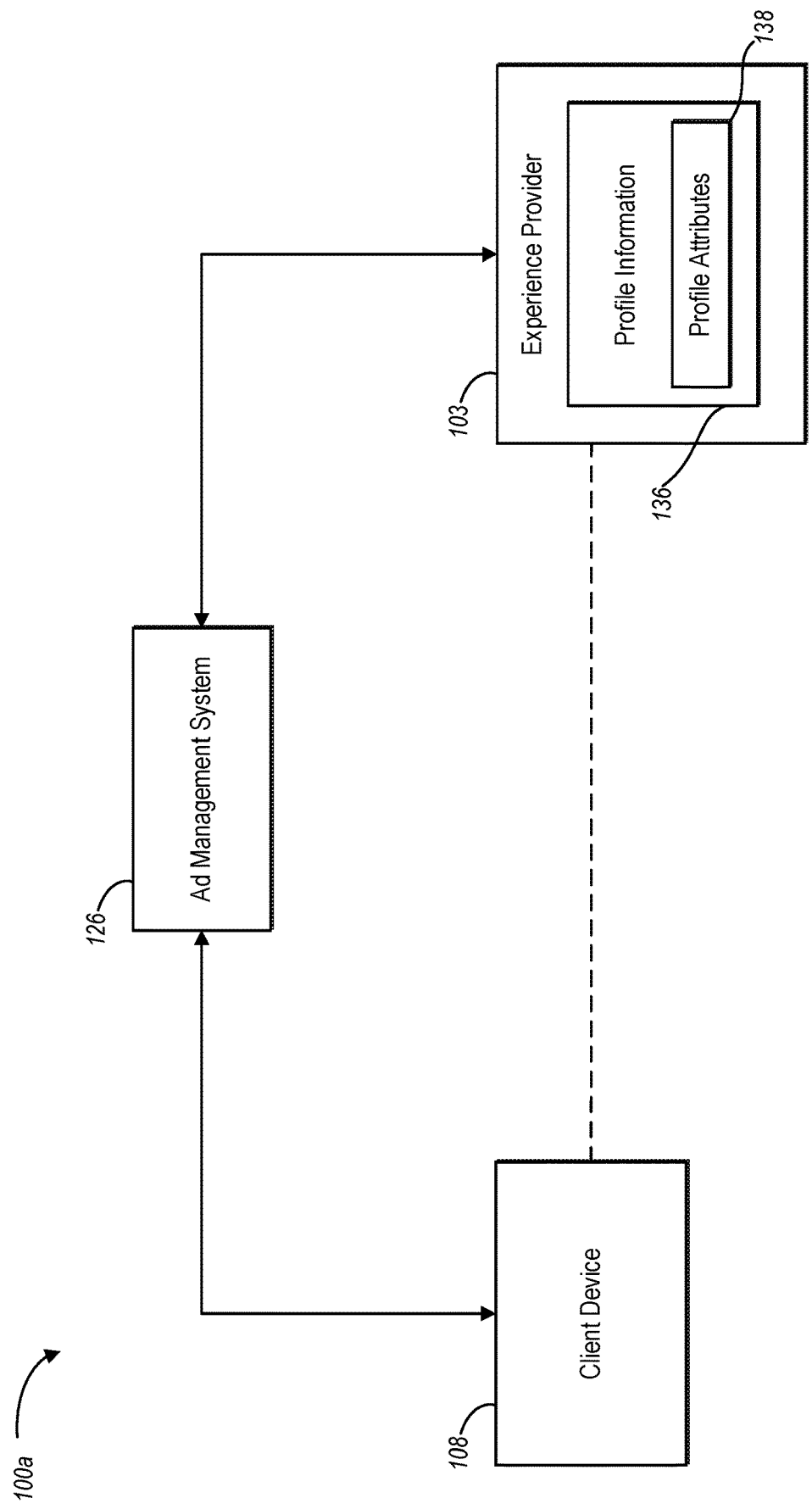
FIG. 2A illustrates a schematic diagram of one embodiment of a system for obtaining user profile information for future visitors in accordance with one or more embodiments of the present invention.

In one embodiment the present invention is directed toward notifying an experience provider (e.g., a web server) that a user is about to be directed to a resource (e.g., web page) hosted by the experience provider. For example, when a user clicks on an advertisement, the ad server can send a notification to the experience provider that the user is going to be directed to a resource associated with the advertisement. The ad server can send the notification so that the experience provider receives the notification prior to the redirected user request for the resource reaching the experience provider. The notification can allow the experience provider to prepare the resource for the user before the redirected request arrives at the resource. Thus, the notification can allow the experience provider to reduce latency by preparing for the user to visit the resource before the user accesses the resource.

One way the experience provider can prepare for the user based on the notification is to retrieve profile information associated with the user. For example, the experience provider can retrieve profile information from a remote storage and store the profile information in a more accessible location. In particular, the experience provider can obtain, based on the notification, profile information from an origin server or other remote server storing profile information. The experience provider can then store the profile information in an edge server, a local cache, or local memory, allowing the experience provider to quickly retrieve the profile information once the user reaches the resource. Thus, storing the profile information in a more accessible location can reduce latency and improve a user experience.

Another way the experience provider can prepare for the user based on the notification is to customize the resource based on the retrieved profile information. For example, the experience provider can use the profile information to customize an experience in anticipation of the client device or user reaching the resource. For example, the experience provider can generate custom content for the resource or customize a manner in which the user can interact with the resource based on the profile information. In various instances, the experience provider can customize some or all of the content or functionality of the resource while the client device is being directed to the resource. Thus, the experience provider can leverage the profile information to provide a customized experience to users upon arrival at, or retrieval of, the resource without increasing latency between selection of an advertisement and arrival at, or retrieval of, the resource.

In another embodiment, the ad server can provide profile information to the experience provider in connection with the notification. For example, the notification can include profile information for a user or client device about to be directed to a resource. Upon receipt of the notification, the experience provider can generate a customized experience, based partially or wholly on the profile information provided in connection with the notification. Providing profile information in connection with the notification allows the experience provider to generate the customized experience without requiring the experience provider to request the profile information from an origin server or other source, thereby reducing the time required to customize the experience or create content for the user.

Still further embodiments include storing profile information in association with an ad server (or an intermediate entity) between the ad server and the commerce server. In particular, the ad server can collect and store information for many different users for use in connection with many different experience providers. The ad server can then provide the profile information in association with user directs to the resource via the ad server. For example, the ad server can send a notification to the experience provider that a user is about to be directed to the resource and allow the experience provider to retrieve stored profile information for the user from the ad server before the ad server directs the user to the resource. Thus, the ad server can monetize collected profile information by selling the profile information to many different experience providers.

As used herein, the term "experience provider" refers to any entity that provides content, products, services, or user experiences via a marketing medium. For example, in one embodiment the term "experience provider" refers to a web server that hosts web pages. In another embodiment, the term "experience provider" refers to an application server that supports a native application running on a tablet, mobile phone, or other client device.

As used herein, the term "resource" refers to any content, interface, products, etc. that an experience provider can provide via a marketing medium. For example, in one embodiment the term "resource" refers to a webpage. Along related lines, the term "resource" can refer to a component of a webpage such as a video, image, or other content or code that forms the webpage. In other embodiments, the term "resource" can refer to a component of a native application running on a tablet, mobile phone, or other client device. In particular, the term "resource" can refer to data or content that an application server can provide to the native application to display as part of the native application. Additionally or alternatively, the term "resource" can refer to a video, data, an image, other content, or an application interface or any interface for presenting content to a user.

As used herein, the term "marketing medium" refers to any medium capable of providing one or more of a resource, content, products, services, or an experience to a user. In one or more embodiments the term "marketing medium" refers to any medium capable of displaying or otherwise providing content or an experience via the Internet. For example, in one embodiment the term "marking medium" refers to a web browser that can render or display a webpage. In another embodiment, the term "marketing medium" refers to a native application running on a tablet, mobile phone, or other client device that can provide content to a user. In yet anther embodiment, the term "marketing medium" refers to a desktop computer application. In still a further embodiment, the term "marketing medium" refers to an Internet-enable video game application that runs on a gaming console.

As used herein, the term "experience" refers to a user experience with the marketing medium and resource. For example, a "customized experience" can include customized content, a customized presentation of the content, a manner in which a user can interact with a marketing medium and resource, or any modifications to a presentation of the resource to one or more users. Thus, the experience provider can provide one or more of customized text, images, video, and audio in a customized layout or presentation to users visiting the marketing medium.

As previously mentioned, one or more embodiments can involve providing a notification to a experience provider that a client device or a user thereof is about to visit a resource associated with the experience provider. As used herein the term "notification" refers to an electronic communication. Example types of "notifications" include calls to a server, a call to an application programming interface ("API"), email, text messages, or other electronic messages.

The notification can allow the experience provider to obtain profile information. As used herein "profile information" can include any type of information that indicates a characteristic, trait, preferences, or interaction history of a user of a client device. For example, profile information can comprise demographic information associated with a client device or user of the client device. In particular, profile information can comprise gender, age, location, one or more user identifiers or aliases, etc. Profile information can include a history of past user activity (web browsing, purchase history, download history, etc.).

The profile information can allow for customizing of the experience for the user. The customized experience can improve the user's experience with a resource. For example, based on the profile information, the experience provider can select content that likely will appeal to the user or that has a higher likelihood that it will appeal to the user based on the profile information.

Referring now to the figures, FIG. 1 is a schematic diagram illustrating an exemplary information system 100 in accordance with an embodiment of the present invention. The information system 100 can provide the infrastructure that allows an experience provider 103 (i.e., server computing device(s) 102 associated with an experience provider 103) to obtain a notification that a user 104 is about to visit a resource 111 by way of a marketing medium 106. An overview of the information system 100 will be described next in relation to FIG. 1. Thereafter, a more detailed description of the components and processes of the information system 100 will be described in relation to FIGS. 2A-4B.

As shown, the marketing medium 106 can comprise a web browser 110 or a communication application 112 (also referred to as a special-purpose client application later herein). In such embodiments where the marketing medium 106 is a web browser and the resource 111 comprises a web page, the backend of the marketing medium 106 (i.e., the set of applications providing data and logic for the marketing medium 106) may include a web application server 114 (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.).

In embodiments where the marketing medium 106 is a native application, the marketing medium 106 can utilize the communication application 112. The communication application 112 in turn may utilize an application server 116 (e.g., a Java application server) of server computing device(s) 102. Applications that use server computing device(s) 102 can be deemed a network application. Applications that do not utilize the application server 116 can be deemed a "stand-alone" application. Accordingly, depending upon the context of the term "application," this term may refer to software executing on the client device 108 or the server computing device(s) 102. In particular, at least a first portion of the marketing medium 106 can execute on the client device 108 and at least a second portion of the marketing medium 106 can execute on the set of one or more server computing device(s) 102.

The client device 108 can comprise a computing device, such as those described below in relation to FIG. 7. The client device 108 can allow a user 104 to access or otherwise interact with an advertisement presented via an ad-hosting medium 124. In various embodiments, the advertisements can include static images, videos, audio, text, or other type of viewable or interactive content. The user can interact with the advertisements, for example, by clicking or otherwise selection the advertisements.

The ad hosting medium 124 can comprise any software or component that can receive and present an advertisement an output interface of the client device 108. For example, the ad hosting medium 124 can comprise websites, native applications, email applications, web browsers, desktop applications, Internet-enabled video games, etc. The ad-hosting medium 124 can receive an advertisement from an ad management system 126 via a network. The network can comprise any of the networks described below in relation to FIG. 7.

The ad management system 126 can include an advertisement manager 128, a notification manager 130, and a marketing medium director 132. Each of the components 128-132 of the ad management system 126 can be in communication with one another using any suitable communication technologies. It will be recognized that although the components 128-132 of the ad management system 126 are shown to be separate in FIG. 1, any of components 128-132 may be combined into fewer components, such as into a single component, or divided into more components as may serve a particular implementation. The components 128-132 can comprise software, hardware, or both. For example, the components 128-132 can comprise one or more instructions stored on a computer-readable storage medium and executable by processors of one or more server ad computing devices 134. When executed by the one or more processors, the computer-executable instructions of the ad management system 126 can cause the one or more ad server computing devices 134 to perform the methods described herein. Alternatively, the components 128-132 can comprise hardware, such as a special purpose processing device to perform a certain function or group of functions. Additionally or alternatively, the components 128-132 can comprise a combination of computer-executable instructions and hardware.

The advertisement manager 128 can provide advertisements to the ad-hosting medium 124. In one or more embodiments the advertisement manager 128 can obtain the advertisements from the experience provider 103. In alternative embodiments, the advertisement manager 128 can generate advertisements. In one or more embodiments the advertisement manager 128 can comprise an ad server, an advertising agent, or a combination thereof as explained below in greater detail in reference to FIGS. 2A-4B.

The marketing medium director 132 can direct the client device 108 to the resource 111 associated with the experience provider 103. For example, the marketing medium director 132, upon a user selecting an advertisement at the client device 108, can direct the client device 108 to the resource 111. In one or more embodiments the marketing medium director 132 can provide a uniform resource locator ("URL") to the resource 111. Alternatively, the marketing medium director 132 can include instructions that cause the client device 108 to perform an application switch from the ad-hosting medium 124 to the marketing medium 106 hosting or providing the resource 111.

As mentioned, the information system 100 can include a notification manager 130 to facilitate notifying experience provider 103 when a client device 108 is being or may potentially be redirected to the resource 111. In one or more embodiments, the notification manager 130 can notify the experience provider 103 by sending identification information associated with the client device 108 to the server computing device(s) 102 prior to redirecting the client device 108 to the resource 111. Sending the identification information to the server computing device(s) 102 may allow the experience provider 103 to obtain profile information associated with the identification information. As explained in greater detail, the profile information can allow the server computing device(s) 102 to provide a customized experience for the user 104 using the profile information by presenting experience data 113 (e.g., customized content 115) to the user 104 at the client device 108.

As shown by FIG. 1, the user 104 can access the resource 111 using the client device 108. The resource 111 can be on the client device 108 or stored elsewhere and simply accessed by the client device 108. The resource 111 may be partially on the client device 108 or wholly contained elsewhere in the information system 100. For example, the resource 111 may be hosted on another device (e.g., the server computing device 102 or other computing device associated with the experience provider 103), and the client device 108 may access the resource 111 from the other device. Alternatively, the client device 108 may download or store an instance or a copy of the resource 111 for use at the client device 108.

As used herein "identification information" refers to information that identifies the client device 108 or the user 104. For example, the identification information can comprise device information associated with the client device 108, such as a hardware model, operating system version, mobile network, and phone number (if the computing device comprises a phone). Identification information can additionally or alternatively can comprise one or more cookies or other personal information collected from the client device 108. Still further the identification information can comprise a unique identifier that can be used to later identify the user 104 or client device 108 once they request or otherwise access the resource 111.

As used herein, "experience data" refers to any data used to provide an experience to the user 104 by way of the marketing medium 108. For example, the experience data 113 can include content presented to the user 104, code (e.g., JavaScript) or other means of determining a presentation of the content 115 or the resource 111 itself, or any other type of data for presenting information to the user 104 associated with the experience provider 103. Experience data 113 may or may not be customized for each individual user 104 visiting or accessing the resource 111 the experience provider 103.

One or more components of the information system 100 can maintain and manage profile information 136 associated with client device 108 or user 104. For example, in one or more embodiments, the experience provider 103 can maintain and manage profile information 136. For example, the server computing device(s) 102 can comprise an origin or remote server that stores profile information for some or each client device that visits the resource 111. Upon receiving a notification that a user is about to be redirected, the experience provider 103 can fetch or retrieve the profile information 136 associated with the user 104 or client device 108. In one or more embodiments, the experience provider 103 can store the profile information 136 in an edge cache, such as application server 116, web server application 114, or memory of the computing device that customizes the experience for the user 104.

Alternatively, the ad management system 126 can maintain and manage profile information 136c associated with client device 108 or user 104. In such embodiments, the ad management system 126 can not only provide a notification that the user 104 or client device 108 is about to visit the resource 111, but can also provide the profile information 136c as well. For example, the ad management system 126 can send profile information 136c to the experience provider 103 in connection with the notification as explained in greater detail below.

In one or more embodiments, the profile information 136, 136c can include one or more profile attributes 138. In particular, the profile attributes 138 can be one or more specific attributes describing the user 104 or the client device 108. For example, the profile attributes 138 can include one or more of a name, age, gender, browsing history, interests, purchase information, preferences, and other information that describes the user 104 or the client device 108. In some embodiments, the profile information 136, 136c can include only some profile attributes 138 used to customize the experience for the user 104. In other embodiments, the profile information 136, 136c can include all of the profile attributes 138 used to customize the experience for the user 104.

As previously mentioned, the system 100 can notify an experience provider 103 when a client device 108 is being or may be directed to a resource 111. FIG. 2A illustrates a schematic diagram of one embodiment of an information system 100a. As illustrated, the information system 100a may include, but is not limited to, a client device 108, an ad management system 126, and an experience provider 103, as described above in relation to FIG. 1. Although FIG. 2A illustrates a particular arrangement of the client device 108, the ad management system 126, and the experience provider 103, various additional arrangements are possible. For example, the components may be communicatively coupled with each other via a network, not shown. Additionally or alternatively, the information system 100a can include one or more other components.

In one or more embodiments, the ad management system 126 stores and manages advertisements used in online marketing. In particular, the ad management system 126 can deliver advertisements provided by an experience provider 103 to one or more visitors of a resource 111. For example, the ad management system 126 can include a database of advertisements that is regularly updated to provide different advertisements each time an instance of the marketing medium 106 is loaded or an advertisement is requested by the marketing medium 106. The ad management system 126 can select advertisements from the database to present in one or more ad spaces of the marketing medium as determined by various experience providers 103 bidding for or otherwise requested advertisements.

In some embodiments, the ad management system 126 can track statistics associated with the advertisements. For example, the ad management system 126 can track the number of clicks for a particular advertisement, the number of clicks for a series of advertisements, the number of times an advertisement has been shown, the websites on which an advertisement has been shown, or other information that may allow an owner of the website or the experience provider 103 to view the benefit of displaying certain advertisements.

As described above, the experience provider 103 can be any entity that provides an experience or a resource 111. In particular, the experience provide can provide experience data 113 or content 115. The content 115 may be any type of content. For example, the experience provider 103 may provide goods or services by way of a website, native application, or other marketing medium 106. In another example, the experience provider 103 provides information or media. The marketing medium 106 may be any interface that allows the experience provider 103 to provide the content 115, including a web browser, a desktop application, a mobile application, or other type of interface.

In one or more embodiments, the experience provider 103 can advertise on any number of ad-hosting media 124 to drive traffic to the resource 111 associated with the experience provider 103. In particular, the experience provider 103 can communicate with the ad management system 126 to serve advertisements to a variety of ad hosting media 124 without having to communicate with or establish a direct relationship with each of the ad hosting media 124. For example, the experience provider 103 can deliver the advertisements to the ad management system 126 for storage at the ad management system 126, and the ad management system 126 can select the particular advertisements for serving in a particular ad space associated with a given ad hosting medium 124 (e.g., website, mobile application, desktop application, email blast).

Additionally, the experience provider 103 can store profile information 136 for customizing the resource 111 or an experience for a user 104. In one or more embodiments, the profile information 136 can include profile information for a user 104 associated with the client device 108, as described above. In particular, the profile information 136 can include one or more of a user identity, user interests, a location associated with the user, and other information that allows the experience provider 103 to tailor the resource 111 or an experience on or with the resource for the user 104. In one example, the profile information 136 can be collected from the user 104 or client device 108 in one or more previous interactions with the experience provider 103.

In some embodiments, a single publisher can maintain the experience provider 103 and the ad management system 126, such that the ad management system 126 serves advertisements within the publisher's domains. In alternative embodiments, a third party can maintain the ad management system 126 with respect to the experience provider 103, such that the ad management system 126 and the experience provider 103 are not maintained by a single entity. For example, the ad management system 126 can assist the experience provider 103 in advertising on websites associated with other experience providers and publishers.

Figure 2B:
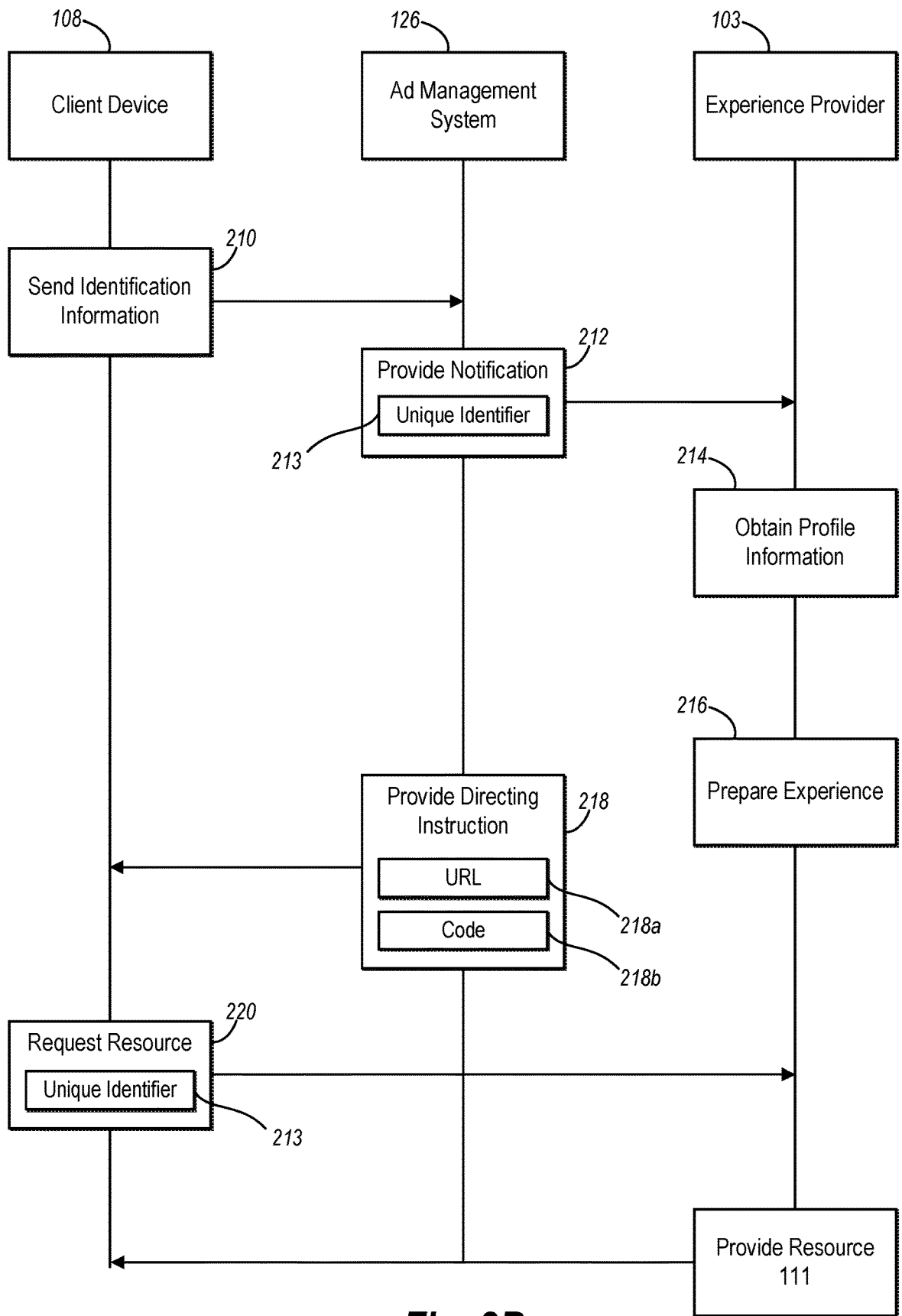
FIG. 2B illustrates a sequence-flow diagram of interactions between the client device, ad server, and experience provider of the system of FIG. 2A in accordance with one or more embodiments.

FIG. 2B illustrates a sequence-flow diagram of obtaining profile information using the information system 100a of FIG. 2A. As shown, each of the components can communicate with each of the other components during various acts in the information retrieval process. While FIG. 2B depicts a process in conjunction with the information system 100a of FIG. 2A, the customization process of FIG. 2B can be used in conjunction with any suitable information system 100a.

In one embodiment, the client device 108 sends identification information 210 to the ad management system 126. The client device 108 can send the identification information 210 as a result of an action taken by a user at the client device 108. In particular, the client device 108 can send the identification information 210 to the ad management system 126 in response to an advertisement selection by the user.

For example, if an advertisement is presented in association with an ad space on a marketing medium 106 on the client device 108, clicking on or otherwise selecting the advertisement can direct the user's browser to a URL associated with the ad management system 126. Alternatively, the client device 108 can send the identification information 210 to the ad management system 126 in response to other actions taken by the user at the client device 108. For example, the client device 108 can send the identification information 210 to the ad management system 126 in response to the advertisement being presented at the client device 108. In other examples, the ad management system 126 can obtain identification information 210 in response to determining that a particular ad space is available, or that an ad space has been successfully purchased.

In one particular embodiment, the identification information 210 includes identification information 210 for a user 104 associated with the client device 108. In particular, the identification information 210 can include an identifier assigned to the user 104. For instance, the ad management system 126 can assign an identifier to the user 104 when the user clicks on an advertisement. The identifier can be any identifier that the experience provider 103 can use to determine which profile information 136 to use or can otherwise correlate a notification 212 to a future request for a resource 111 or visit to the resource 111.

In one embodiment, the client device 108 can send information related to the action taken by the client device 108 or the user 104 as part of or in conjunction with the identification information 210, allowing the ad management system 126 to determine at least some of the identification information 210 based on the advertisements. In particular, information describing the ad hosting medium 124 on which the advertisement is presented can be collected by the ad management system 126. In one or more embodiments, the identification information 210 can describe the type of content 115 displayed on the ad-hosting medium 124. For example, the identification information 210 can describe a category (sports-related content) associated with the content 115 displayed on the ad hosting medium 124.

According to one or more embodiments of the information system 100a, the ad management system 126 or the experience provider 103 can obtain information about the client device 108 or a user 104 associated with the client device 108. In particular, the identification information can include information to allow the experience provider 103 to identify one or more characteristics of the client device 108 or user 104 for associating with profile information 136 at the experience provider 103. For example, the identification information can include location information for the client device 108. Additionally or alternatively, the identification information 210 can include hardware or software information associated with the client device 108.

After obtaining the identification information 110 for the client device 108 or the user 104, the ad management system 126 provides a notification 212 to the experience provider 103. In particular, the ad management system 126 can send the notification 212 to inform the experience provider 103 that a client device 108 associated with the identification information 210 may request, may be or is arriving at the resource 111. In other words, the notification 212 indicates to the experience provider 103 that a user 104 associated with the identification information 210 is about to be redirected to a resource 111 associated with the experience provider 103. For example, the ad management system 126 can include or otherwise cause the identification information 210 to be included in the notification 212 to the experience provider 103.

Specifically, the ad management system 126 can provide the notification 212 by making a call to the experience provider 103 (i.e., server computing device(s) 102). The call to the experience provider 103 can include at least some of the identification information 210 so that the experience provider 103 can identify the client device 108 when the client device 108 arrives at the resource 111. The notification can include a data packet with the identification information 210 and/or other information that allows the experience provider 103 to match the information in the notification 212 to the information in a subsequent request for the resource 111 by the client device 108. Alternatively, the ad management system 126 can provide the notification 212 using any method as may serve a particular implementation of the information system 100a. For example, the ad management system 126 can provide the notification 212 as an email, text, API call, or other electronic message.

In one or more embodiments, the notification 212 includes a unique identifier 213. The unique identifier 213 can comprise a randomly generated identifier. The unique identifier 213 can be a probabilistically distinct identifier. As explained below, the unique identifier 213 can allow the experience provider 103 to link the notification 212 indicating a future visit to the later visit. In one embodiment, the ad management system 126 can generate a URL 218a including a unique identifier 213 corresponding to the client device 108. For example, when the client device 108 contacts the ad management system 126 after an advertisement is clicked, the ad management system 126 can use a redirection URL 218a that points to a landing page in or with the notification 212. The ad management system 126 can append or add the unique identifier 213—for example, a key with a unique combination of characters—to the URL to indicate to the experience provider 103 that the client device 108 will arrive at the landing page with the unique identifier 213 in the URL 218a. Additionally or alternatively, at least some profile information 136 or profile attributes 138 can be included in the notification 212, for example, in the URL 218a in addition to the unique identifier 213.

As shown by FIG. 2B, upon receiving the notification 212, the experience provider 103 can obtain 214 at least some profile information 136. For example, using the identification information 210 included with the notification 212, the experience provider 103 can retrieve profile information 136 from a remote or origin server. One will appreciate that retrieving the profile information 136 upon receiving the notification 212 of a future visit to the resource 111 can reduce latency and otherwise allow the experience provider 103 to provide an enhanced user experience.

Additionally, the experience provider 103 can store the retrieved profile information at a local cache. For example, the experience provider 103 can store the retrieved profile information 136 at a server-computing device 102 which will provide or customize the experience for the user 104. More specifically, the experience provider 103 can store the profile information 136 in an edge cache or even local memory to reduce latency.

In one or more embodiments, the experience provider 103 can use the profile information 136 to prepare an experience 216 that is customized for the user 104 or client device 108. In particular, the experience provider 103 can use the profile information 136 to select or otherwise customize the experience to the user 104 or client device 108. For example, the experience provider 103 can select content 115 based on information in the profile information 136 such as a location of the client device, a sex of the user 104, an age of the user 104, preferences of the user 104, past shopping or other activities of the user, etc. Targeting the user's interests may help the experience provider 103 reduce the bounce rate and improve the possibility of converting the user to a customer.

In one implementation, the profile information 136 can include information associated with the user. The experience provider 103 can use the profile information 136 to log the user into a user account associated with the experience provider 103. Additionally or alternatively, the profile information 136 can be used to customize the experience for the user 104. Specifically, the experience provider 103 can use the profile information 136 to generate an experience in which the user might be interested. For example, if the profile information 136 includes information that indicates the user is interested in a particular product—for example, based on the user's purchase history or browsing history— the experience provider 103 can tailor the resource 111 to depict other products similar to the particular product.

In some embodiments, the experience provider 103 may have only certain information associated with the client device 108 for customizing the experience for the user 104. For example, the experience provider 103 may only be able to determine that the user 104 associated with the client device 108 has a certain gender. The experience provider 103 can use the limited profile information 136 to provide at least a partially customized experience to target the user's interests.

According to various embodiments, the experience provider 103 can prepare the customized experience for the user 104 before the client device 108 is directed to the resource 111. In particular, the experience provider 103 can retrieve the profile information 136 in response to receiving the notification 212 and generate at least a portion of the resource 111. For instance, the resource 111 can include hypertext markup language (HTML) content generated by the experience provider 103 in accordance with the profile information 136 prior to the client device 108 arriving at the URL 218a associated with the HTML content. Thus, a landing page can be loaded immediately upon arrival of the client device 108, rather than waiting until the client device 108 arrives to assemble the landing page.

As mentioned previously, the experience provider 103 can obtain the profile information 136 from a remote location and store the profile information 136 locally. Specifically, the experience provider 103 can obtain the profile information 136 from a remote server associated with the experience provider 103 or outside the information system 100 and store the customization in a location more quickly accessible to the experience provider 103 in preparation for presenting experience data 113 to the client device 108. For example, the experience provider 103 can store the profile information 136 in an edge cache or in a local cache.

In some embodiments, the profile information 136 can remain in the edge cache or local cache until the client device 108 arrives at the resource 111. The experience provider 103 can retrieve the profile information 136 and generate the content 115 or customized experience for the user 104 by quickly accessing the information from the edge cache or local cache. This can allow the experience provider 103 to generate the content 115 and customize the experience quicker than waiting to access the profile information 136 until after the client device 108 arrives at the resource 111.

According to one or more embodiments, the ad management system 126 provides a directing instruction 218 to the client device 108 after sending the notification 212 to the experience provider 103. In particular, the ad management system 126 can send the client device 108 (i.e., a web browser 110) a redirect URL 218a to direct the client device 108 to the resource 111. In one example, the redirect URL 218a includes the unique identifier 213 that the ad management system 126 sent to the experience provider 103 in the notification 212, such that the client device 108 is redirected to the URL 218a indicated by the ad management system 126 when notifying the experience provider 103 of the client device 108 future visit. In some embodiments, the ad management system 126 sends the redirect URL 218a immediately after sending the notification 212 to the experience provider 103. In other embodiments, the ad management system 126 can perform other functions associated with redirecting the client device 108 before sending the redirect URL 218a to the client device 108.

In alternative embodiments, the directing instruction 218 comprise instructions or code 218b that causes the client device 108 to perform an app switch from the ad hosting medium 124 to the marketing medium 106 hosting or otherwise presenting the resource 111. In particular, when the marketing medium 106 comprises a local or native application, the ad management system 126 can cause the client device 108 to open the local or native application that provides the resource 111.

Upon receiving the directing instruction 218, the client device 108 can request 220 the resource 111. For example, the client device 108 (if applicable web browser 110 in the instance that the marketing medium 106 comprises a webpage) can request the resource 111 from the experience provider 103. For example, the client device 108 can request a URL corresponding to the resource 111 within the marketing medium 106.

Alternatively, when the marketing medium 106 comprises a local or native application, the client device 108 can request the operating system to open the marketing medium 106 to a resource 111. In one or more embodiments the client device 108 can perform an app switch and transition from the ad-hosting medium 124 to the marketing medium 106. In one or more embodiments the marketing medium 106 can comprise a native application that allows for the purchase of content, such as applications, music, video, etc.

In any event, the request 220 for the resource 111 can include the unique identifier 213. When the experience provider 103 receives the request 220 for the resource 111 with the unique identifier 213, the experience provider 103 can use the unique identifier 213 to access an experience or profile information 136 prepared based on receiving the notification 212 with the same unique identifier 213. In other words, the unique identifier 213 in the request 220 for the resource 111 can allow the experience provider 103 to link the request 220 with the previous notification 212 and an content, profile information, or experience previously retrieved or prepared based on the notification 212.

In one or more embodiments, upon the client device 108 requesting the resource 111, the experience provider 103 can provide the experience 216 and the resource 111 to the user 104. For example, the experience provider 103 can provide the resource 111 associated with a redirect URL 218a. The marketing medium 106 can present the resource 111 to include content 115 generated for the client device 108 or user 104. For instance, the resource 111 can comprise a landing page with a customized experience for the user 104 or client device 108. Specifically, the experience provider 103 can determine that the client device 108 arriving at the landing page corresponds to the retrieved profile information 136 based on the unique identifier 213 included with the request 220 for the resource 111.

In one or more embodiments, the experience provider 103 can customize the experience 216 for current visitors. In particular, the experience provider 103 can use the information associated with one or more future visitors about to arrive at the landing page to customize an experience for visitors already viewing the landing page. For example, the experience provider 103 can change the page content 115 or other experience data 113 for the current visitors by changing the prices or availability of a particular product or service based on notifications 212 that one or more additional users with visit the resource 111 in the future.

Figure 2C:
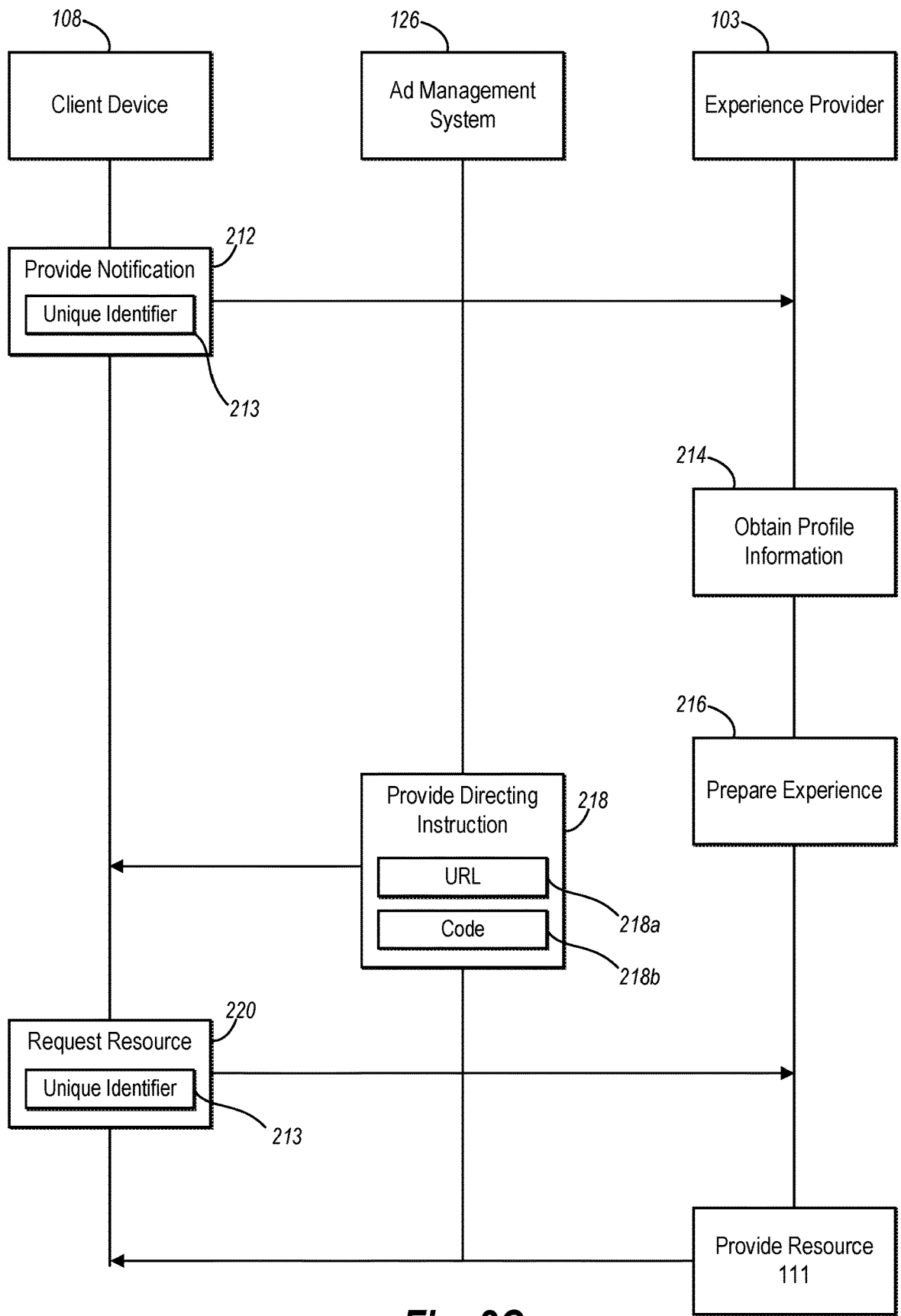
FIG. 2C illustrates a sequence-flow diagram of interactions between the client device, ad server, and experience provider of the system of FIG. 2A in accordance with one or more embodiments.

FIG. 2C illustrates a sequence-flow diagram of obtaining profile information using the information system 100a of FIG. 2A. As shown in FIG. 2C, the client device 108 can instead provide the notification 212 directly to the experience provider 103. In particular, the ad management system 126 may not provide any advance notification to the experience provider 103 that the client device 108 is about to visit or request the resource 111 from the experience provider 103. Rather, the client device 108 cam notify the experience provider 103 that the client device 108.

More specifically, ad management system 126 can embed a pixel tag in the advertisement that causes the client device 108 to make a call to the experience provider 103 (i.e., server computing device(s) 102) upon rendering of the advertisement by the client device 108. The notification 212 can comprise the call to the server computing device(s) 102 for the pixel information associated with the pixel tag. When making the call, the client device 108 can retrieve and send a cookie associated with the experience provider 103 or the resource 111 to the server computing device(s) 102. The cookie can comprise the identification information 210.

Alternatively, ad management system 126 can embed a script in code for the advertisement that causes the client device 108 to call a server computing device(s) 102 upon selection of the advertisement by the client device 108. For example, the script can comprise JavaScript that causes a pixel tag to fire upon the user 104 selecting the advertisement. The notification 210 can comprise the call to the server computing device(s) 102 for the pixel information associated with the pixel tag.

After the client device 108 provides the notification 212 to the experience provider 103, the experience provider 103 can obtain the profile information 214, prepare the experience 216, and provide the resource 111 to the client device 108 as in FIG. 2B. In particular, the ad management system 126 can provide the directing instruction 218 at some point after providing the notification 212 to the experience provider 103. Additionally, the client device 108 requests the resource 220 from the experience provider 103 in response to receiving the directing instruction 218 from the ad management system 126.

Figure 2D:
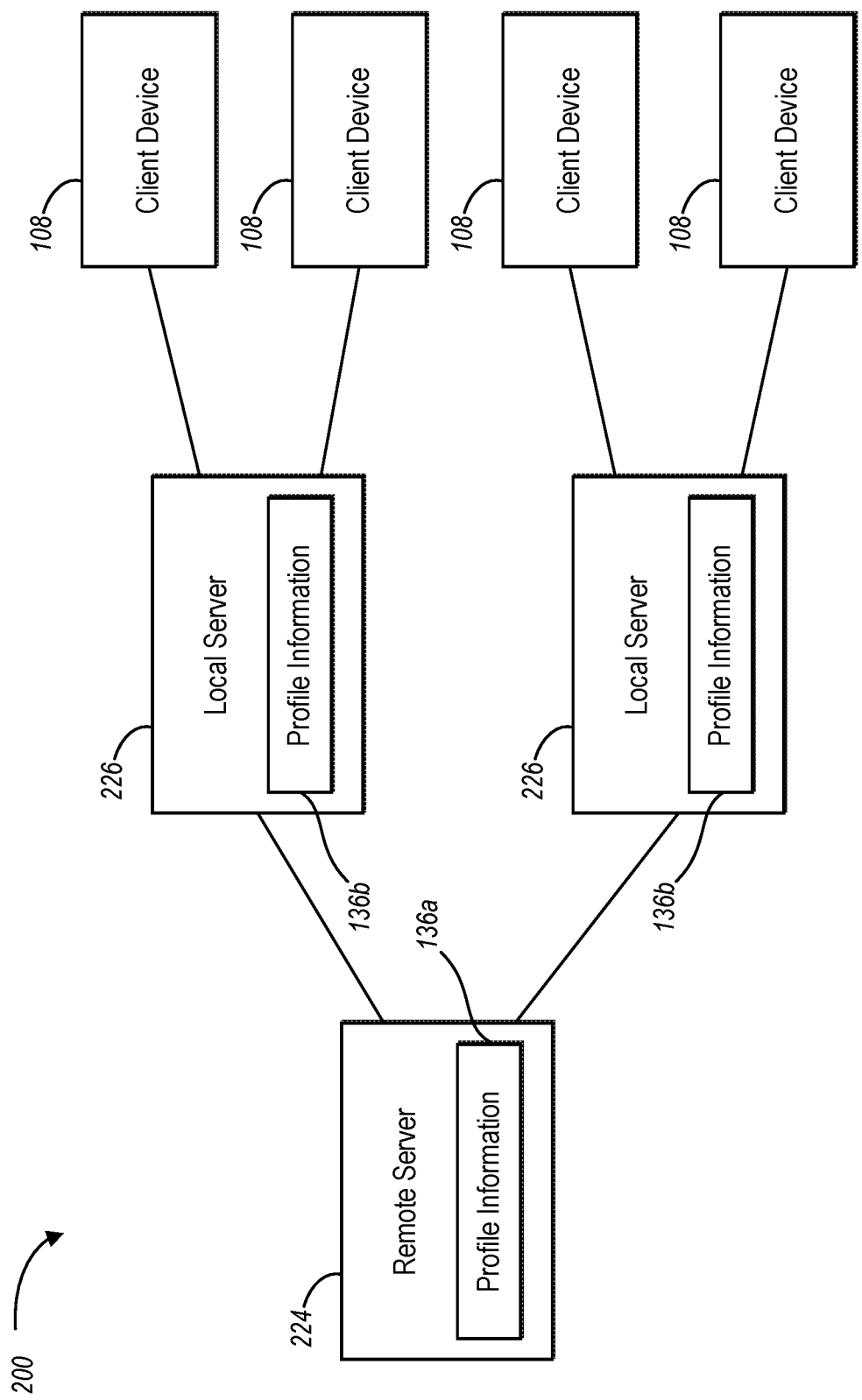
FIG. 2D illustrates a schematic diagram of one embodiment of a backend system for storing profile information in accordance with one or more embodiments.

As previously mentioned, the experience provider 103 can obtain profile information from a remote server 224. FIG. 2D illustrates a profile manager system 200 including profile information 136a stored on a remote server 224. The remote server 224 can be in communication with one or more local servers 226. The local servers 226 can also be connected to or access by one or more client devices 108. While the profile manager system 200 of FIG. 2D depicts a single remote server 224 and a plurality of local servers 226 and client devices 108, the profile manager system 200 can include any number of remote servers 224, local servers 226, or client devices 108 as may serve a particular implementation.

In one or more embodiments, the remote server 224 stores profile information 136a for providing a customized experience to a user 104 at one of the client devices 108. The local servers 226 may be associated with one or more experience providers 103. For example, each local server 226 can be associated with a different experience provider 103. Alternatively, each local server 226 can be associated with a single experience provider 104. The local servers 226 may also be maintained in the same or separate physical locations, for example, to provide an experience to users 104 in different regions of the world or within specific geographical regions.

According to some embodiments, the profile information 136a obtained from the remote server 224 can be stored in conjunction with profile information 136b at one or more of the local servers 226. In particular, the local servers 226 can store profile information 136b for each of the users 104 and or client devices 108. For example, when the local servers 226 obtain the profile information 136a from the remote server 224, the local servers 226 can merge or reconcile the profile information 136b at the local servers 226 with the newly obtained profile information 136a from the remote server 224. Alternatively, the local servers 226 can replace the locally stored profile information 136b with the profile information 136a from the remote server 224. In yet other embodiments, the local servers 226 may not store the profile information 136a from the remote server 224, but may use the profile information 136a to customize the experience for one or more of the client devices 108 and discard the profile information 136a after the local servers 226 are done customizing the experience.

Figure 3A:
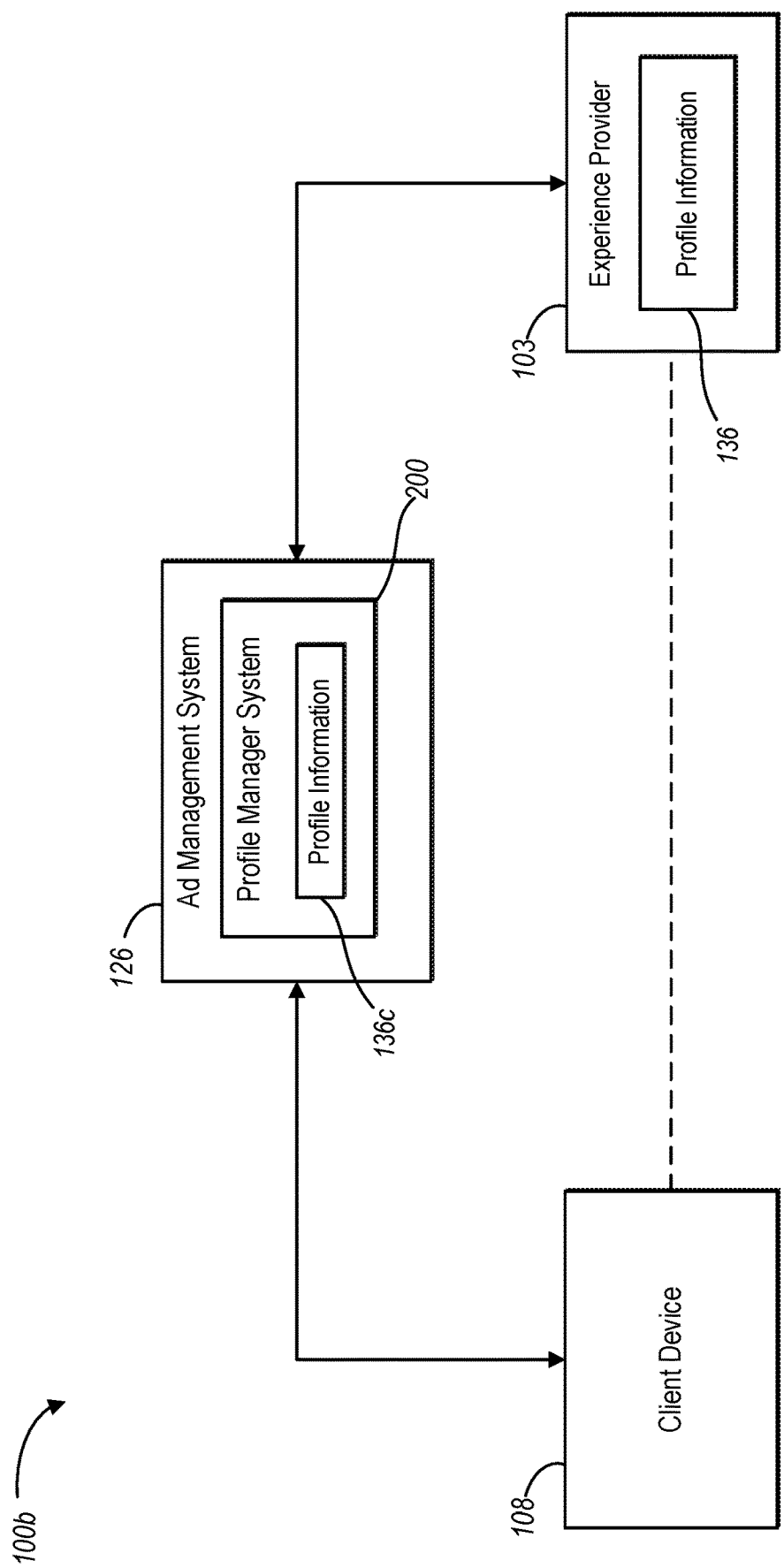
FIG. 3A illustrates a schematic diagram of another embodiment of a system for obtaining user profile information for future visitors in accordance with one or more embodiments.

As a general summary, obtaining profile information for experience and resource 111 customization as described in FIGS. 2B and 2C can apply to the information system 100a of FIG. 2A. The experience provider 103 of FIG. 2A maintains the profile information 136 used to customize an experience. The profile information 136 can be stored in various locations within the information system 100 of FIG. 1, for example, on a remote server or on a local server, as shown in FIG. 2D. FIG. 3A illustrates another embodiment of an information system 100b including a client device 108, an ad management system 126, and an experience provider 103. The profile information 136c in the information system 100b can be stored in whole or in part at the ad management system 126. Alternatively, at least some profile information 136d in the information system 100b can be stored at the experience provider 103, such that the profile information 136d can be merged with or replaced by the profile information 136c at the ad management system 126.

In some embodiments, the ad management system 126 includes a profile manager system 200, as described in FIG. 2D, to maintain profile information 136c (e.g., user profile information) for many different users. Additionally, ad management system 126 can serve advertisements from many different experience providers to many different marketing media. User profile information maintained by the ad management system 126 can be related to the advertisements served by the ad management system 126 or to any type of service provided by the ad management system 126. In particular, the ad management system 126 can provide many different services and can collect and maintain information associated with many different client devices 108 and users 104. For example, the ad management system 126 can also be an experience provider 103 that advertises on many different websites, including websites owned and operated by the ad management system 126. This may allow the ad management system 126 to collect large stores of data about many users for in order to provide targeted advertisements or other content 115 to those users.

In one or more embodiments, the ad management system 126 can sell or otherwise provide the profile information 136c to one or more other experience providers 103 to allow experience providers 103 to provide a customized experience. In particular, the ad management system 126 can provide user profile information associated with a user 104 to allow the experience provider 103 to generate a personalized experience for the user 104 when the ad management system 126 redirects the user 104 to resource 111. For example, the ad management system 126 can provide user browsing habits, user location information, a product purchase history for the user 104, or other information that may allow the experience provider 103 to personalize experience for the user 104.

Figure 3B:
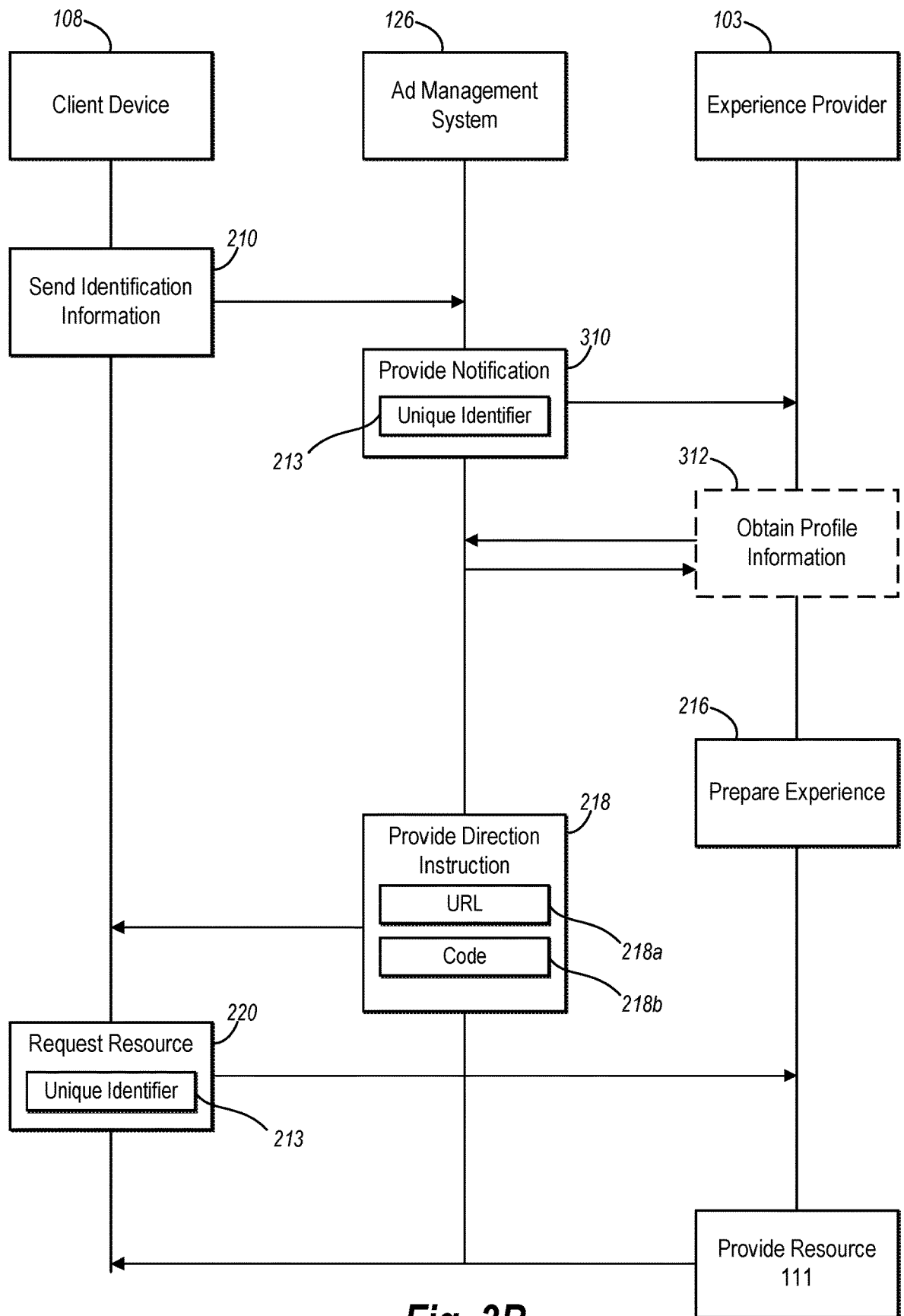
FIG. 3B illustrates a sequence-flow diagram of interactions between the client device, ad server, and experience provider of the system of FIG. 3A in accordance with one or more embodiments.

FIG. 3B illustrates a sequence-flow diagram for one embodiment of obtaining profile information 136c in the information system 100b of FIG. 3A. Although the information retrieval process of FIG. 3B is described in conjunction with the information system 100b of FIG. 3A, the information retrieval process of can be used in conjunction with any suitable information system.

As described previously in connection with FIG. 2B, the client device 108 can send identification information 210 to the ad management system 126. Because the ad management system 126 maintains the profile information 136c for the user 104 or client device 108, the ad management system 126 can match the identification information 210 sent from the client device 108 with the profile information 136c at the ad management system 126. Storing the profile information 136c at the ad management system 126 may also allow the ad management system 126 to improve the profile information 136c in relation to the identification information 210 and the advertisements in a database associated with the ad management system 126. For example, the ad management system 126 can update the profile information 136c based on new information such as additional interests, updated contact information, or other changes to the profile information 136c.

In one or more embodiments, the ad management system 126 provides a notification 310 to the experience provider 103 based on the identification information 210 from the client device 108. The notification 310 can be similar or substantially the same as notification 212 described above in relation to FIG. 2B. Alternatively, the notification 310 can comprise an indication that the ad management system 126 has profile information 136c available for a user 104 or client device 108 about to be redirected to the resource 111.

For example, the ad management system 126 can send a URL 218a to which the client device 108 or user 104 is to be redirected so that the experience provider 103 can know that the client device 108 or user 104 will be arriving or is likely to arrive at the specified URL 218a. In one example, the ad management system 126 can include a unique identifier 213 in the notification 310 that is associated with profile information 136c stored at the ad management system 126 for the client device 108. In alternative embodiments, the ad management system 126 can provide the notification 310 and the unique identifier 213 via an API call or other electronic communication.

In one or more embodiments the experience provider 103 can contact the ad management system 126 after receiving the notification 310 to obtain 312 profile information 136c. For example, the experience provider 103 can determine the unique identifier 213 from the notification 310. The experience provider 103 can then request profile information 136c from the ad management system 126 associated with the unique identifier 213. For instance, the experience provider 103 can make an API call to the ad management system requesting profile information 136c associated with the unique identifier 213. In one or more embodiments the ad management system 126 can charge the experience provider 103 per each profile or profile attribute 138 provided. Alternatively, the experience provider 103 can choose not to obtain profile information 136c in association with one or more advertisements. Thus, the experience provider 103 may elect to generate a customized experience or generic experience for user 104 or client device 108.

In alternative embodiments, the ad management system 126 can also generate and send the notification 310 with the profile information 136c stored at the ad management system 126. For example, the experience provider 103 may contract with the ad management system 126 to provide the profile information 136c for every client device 108 or user 104 redirected to the experience provider 103. Including profile information 136c in connection with the notification 310 may provide the experience provider 103 with advance notice of the type of customized experience to create.

Similar to the description provided above in relation to FIG. 2B, the experience provider 103 can cache or otherwise locally store the profile information 136c received from the ad management system 126. For example, the experience provider 103 can merge or reconcile the profile information 136c with profile information 136 stored at the experience provider 103. Furthermore, the commerce application can prepare the experience 216 as described above in relation to FIG. 2B. Similarly, the ad management system 126 can provide a directing instruction 218 (including a redirect URL 218a or redirect code 218b) that causes client device 108 to request or be directed to the resource 111 in association with the unique identifier 213. The client device 108 in turn can request 220 the resource 111, or access thereto, as described above in relation to FIG. 2B. Finally, the experience provider 103 can provide the experience 216 and the resource 111 for the user 104 in response to the request 220 as described above. In particular, using the unique identifier 213 included with the request 220, the experience provider 103 can retrieve and provide the prepared experience 216 and resource 111 for the user 104. Alternatively, the experience provider 103 may not request the profile information 136c and may not customize the experience for the user 104.

Figure 4A:
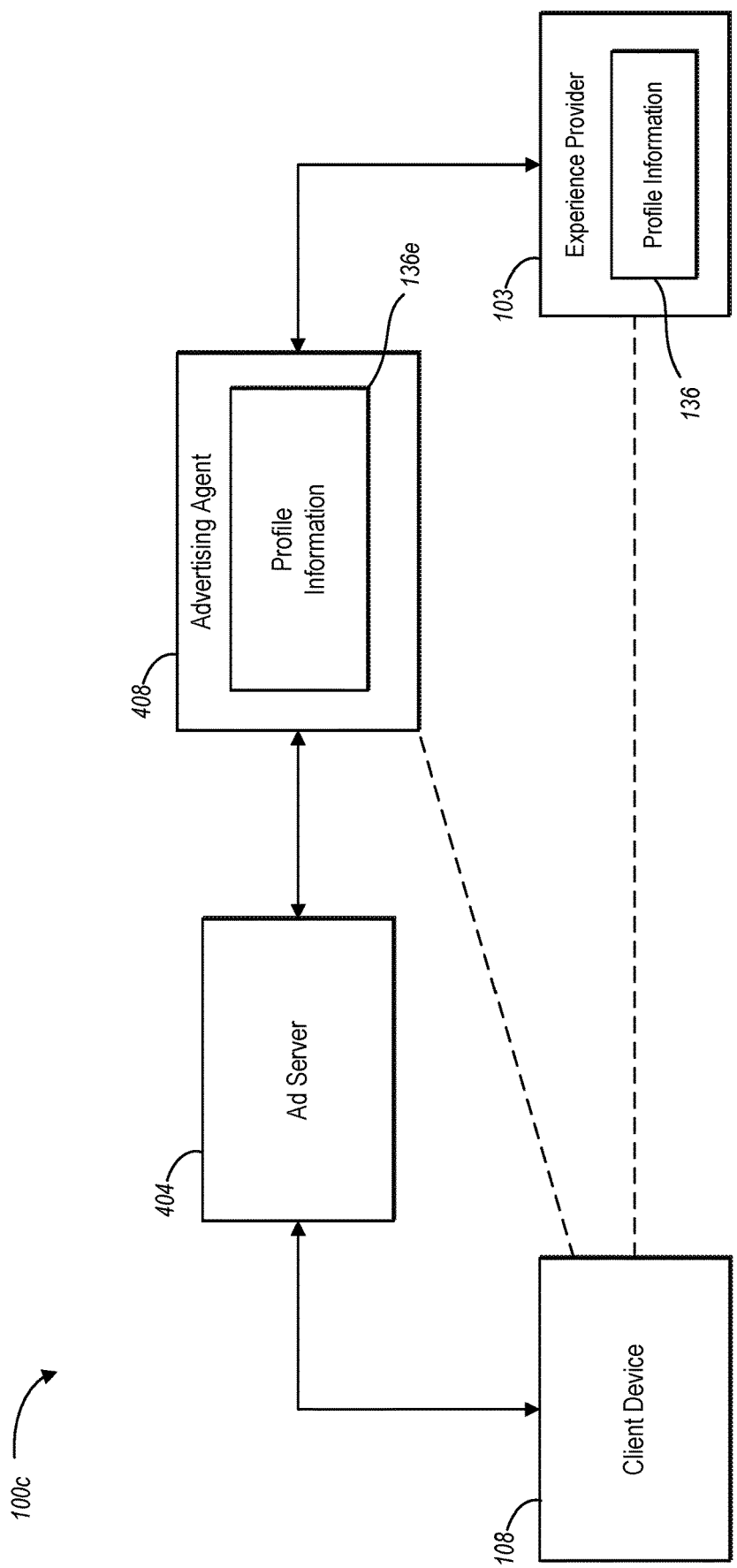
FIG. 4A illustrates a schematic diagram of yet another embodiment of a system for obtaining user profile information for future visitors in accordance with one or more embodiments.

FIG. 4A illustrates another embodiment of an information system 100c including a client device 108, an ad server 404, an experience provider 103, and an advertising agent 408. At least some of the profile information 136e can be stored at the advertising agent 408 between the ad server 404 and the experience provider 103. While the embodiment of FIG. 4A depicts only one of each of the client device 108, ad server 404, advertising agent 408, and experience provider 103, the information system 100c can include any number of components. Additionally or alternatively, the information system 100c can include other components not shown in FIG. 4A.

One or more embodiments of the information system 100c can include an advertising agent 408 to facilitate interaction between the ad server 404 and the experience provider 103. In particular, the advertising agent 408 can bid on ad spaces for the experience provider 103 via the ad server 404. For example, the advertising agent 408 can determine that the ad space corresponds to a particular website or a particular targeted demographic and bid on the ad space for the experience provider 103. When the advertising agent 408 succeeds in obtaining an ad space, the advertising agent 408 can determine the ad to display in the ad space via the ad server 404.

As illustrated in FIG. 4A, the advertising agent 408 can store, maintain, or have access to the profile information 136e associated with one or more users 104 or client devices 108. In particular, the advertising agent 408 can access information that can be used by the experience provider 103 to personalize or otherwise customize the experience for presenting to the client device 108 or user 104 in association with an advertisement presented to the client device 108. For example, the advertising agent 408 can obtain profile information 136e for the user 104 or other information that indicates preferences, characteristics, or interests associated with the user 104 or client device 108. In one implementation, the advertising agent 408 can access the profile information 136e from a server within a local network.

In some embodiments, the advertising agent 408 can provide a variety of services in addition to managing advertisements. Similar to the ad management system 126 in FIG. 3A, the advertising agent 408 can leverage such services to obtain information about users 104 and client devices 108 that use the services provided by the advertising agent 408. The user 104 or client device 108 information can be used to build profile information 136e for providing targeted advertising or allowing other components in the information system 100c or other systems to provide a customized experience. In alternative embodiments, the advertising agent 408 can be in communication with another component that provides additional services.

In one or more embodiments, and as described in more detail below, when a user 104 is redirected to the experience provider 103 by the advertising agent 408 in association with an advertisement presented at the client device 108, the advertising agent 408 can notify the experience provider 103 that the client device 108 is likely to or is about to arrive at a landing page associated with the experience provider 103. The experience provider 103 can present a customized experience to the client device 108 via the marketing medium 106 based on profile information 136 obtained from the advertising agent 408.

Figure 4B:
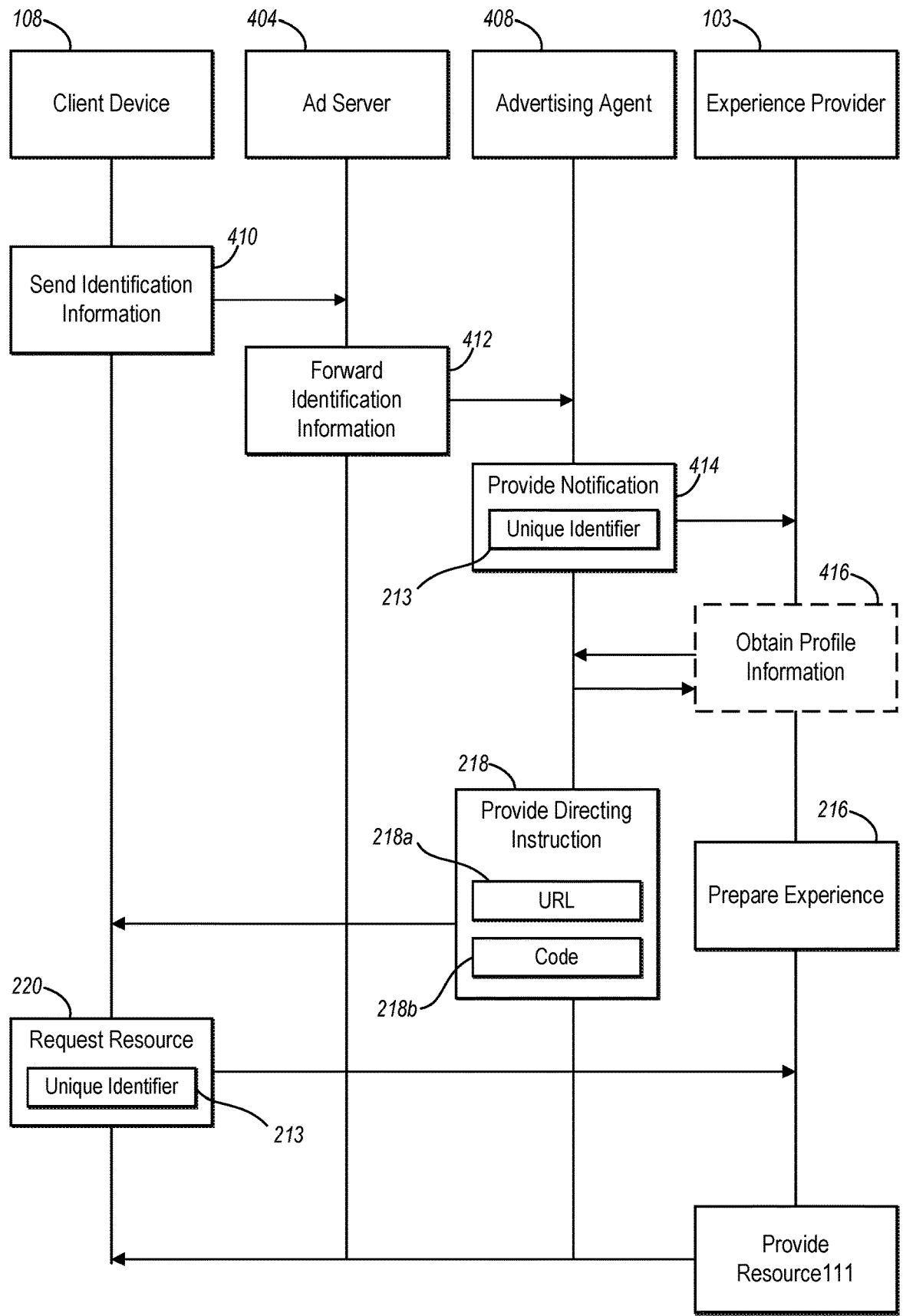
FIG. 4B illustrates a sequence-flow diagram of interactions between the client device, ad server, advertising agent, and experience provider of the system of FIG. 4A in accordance with one or more embodiments.

FIG. 4B illustrates an information retrieval process using the information system 100c of FIG. 4A. Although the information retrieval process of FIG. 4B is described in conjunction with the information system 100c of FIG. 4A, the information retrieval process can be used in conjunction with any suitable information system.

In some embodiments, the client device 108 sends identification information 410 to the ad server 404. The identification information 410 can identify the client device 108 or one or more users 104 associated with the client device 108. In particular, the identification information 410 can include information describing one or more characteristics of the client device 108 or the users 104. For example, the identification information 110 can include location information for the client device 108—e.g., an Internet Protocol (IP) address—usage information for the client device 108, hardware/software information for the client device 108, profile information for the user(s), or other information. In alternative embodiments, the identification information 410 only includes information sufficient to identify that the client device 108 is a particular device associated with profile information 136e at the advertising agent 408. In one or more embodiments, the client device 108 sends the identification information 410 to the ad server 404 similar to one or more of the method described above in relation to the step 210 of FIG. 2B.

According to one or more embodiments, the ad server 404 forwards 412 the identification information 410 to the advertising agent 408 after receiving the identification information 410 from the client device 108. In particular, the ad server 404 can send the identification information 410 to the advertising agent 408 as part of redirecting the client device 108 to the resource 111. For example, the ad server 404 may include more than one server, each of which may perform different operations associated with the redirection process. The ad server 404 can forward the identification information to the advertising agent 408 from a first server before any of the other servers associated with the ad server 404 receive any data associated with the redirection process.

When the advertising agent 408 receives the identification information 412 from the ad server 404, the advertising agent 408 sends a notification 414 to the experience provider 103. In particular, the advertising agent 408 can send the notification 414 in response to different actions taken at the client device 108, the ad server 404, the advertising agent 408 or the experience provider 103. In one or more embodiments, the advertising agent 408 can send a notification 414 to the experience provider 103 to load profile information 136e associated with a particular characteristic at the time of bidding for an ad space on a particular website. In other embodiments, the advertising agent 408 can send a notification 414 to the experience provider 103 to load profile information 136e associated with a particular characteristic in response to successfully purchasing the ad space. In such embodiments, the experience provider 103 may target the particular characteristic (e.g., gender) because the experience provider 103 may not have sufficient identification information 410 to identify a particular user 104.

In alternative embodiments, the advertising agent 408 can send a notification 414 to the experience provider 103 to load profile information 136e associated with a particular user 104 in response to presenting an advertisement in the ad space or in response to an advertisement click at the client device 108. In particular, the experience provider 103 may be able to successfully identify the particular user 104 based on identification information 410. For example, the advertising agent 408 can receive the identification information 410 from the ad server 404 in a cookie. The cookie can contain the identification information 410 in the form of a unique identifier 213 or other data that allows the advertising agent 408 to determine the identity of the client device 108 or the user 104 associated with the identification information 410. In alternative embodiments, the advertising agent 408 can receive the identification information 410 in another form that allows the advertising agent 408 to determine the identity of the client device 108 or the user 104.

In one or more embodiments, after receiving the identification information 110, the advertising agent 408 can identify profile information 136e based on the identification information 410. In particular, the advertising agent 408 can search a database containing the profile information 136e using the identification information 410. For instance, the database can contain a list of profiles associated with one or more client devices 108 or users 104 associated with the advertising agent 408 or experience provider 103. The advertising agent 408 can select the profile corresponding to the identification information 410 received from the ad server 404 to obtain the appropriate profile information 136e.

Because the advertising agent 408 maintains or has access to the profile information 136e for the user 104 or client device 108, the advertising agent 408 can match the identification information 410 forwarded from the ad server 404 with the profile information 136e. Storing the profile information 136e at the advertising agent 408, or at a local server associated with the advertising agent 408, may also allow the advertising agent 408 to manage the profile information 136e for the experience provider 103. For example, the advertising agent 408 can update the profile information 136e based on recent identification information 410 or content usage information collected for the user 104.

In one or more implementation the experience provider 103 can obtain 416 profile information 136e from the advertising agent 408 in response to receiving the notification 414 with the identification information 410. For instance, the experience provider 103 can request that the advertising agent 408 send any profile information 136e associated with the identification information 410 to the experience provider 103. Alternatively, the experience provider 103 can elect not to obtain profile information 136e in association with one or more advertisements. Additionally, the experience provider 103 can merge or reconcile the profile information 136e from the advertising agent 408 with profile information 136 maintained by the experience provider 103.

In alternative embodiments, the advertising agent 408 can also generate and send the notification 414 based on profile information 136c stored at the ad server 404. For example, the advertising agent 408 can provide the profile information 136c for every client device 108 redirected to the experience provider 103 based on an agreement between the advertising agent 408 and the experience provider 103. Profile information 136c in the notification can provide the experience provider 103 with advance notice of the type of customized experience to create.

Similar to the description provided above in relation to FIG. 2B, the experience provider 103 or the advertising agent 408 can cache or otherwise locally store the profile information 136e. Furthermore, the commerce application can prepare the experience 216 as described above in relation to FIG. 2B. Similarly, the advertising agent 408 can provide a directing instruction 218 (e.g., URL 218a or code 218b) that causes client device 108 to request or be directed to the resource 111. The client device 108 in turn can request 220 the resource 111, or access thereto, in association with the unique identifier 213 as described above in relation to FIG. 2B. Finally, the experience provider 103 can provide the experience 216 and resource 111 for the user 104 in response to the request 220 as described above. Alternatively, the experience provider 103 may not request the profile information 136e and may not customize the experience when preparing the experience 216.

FIGS. 1-4B, the corresponding text, and the examples, provide a number of different systems and devices for prefetching information for webpage customization. In addition to the foregoing, embodiments of the present invention also can be described in terms of flowcharts comprising acts and steps in a method for accomplishing a particular result. For example, FIGS. 5 and 6 illustrate flowcharts of exemplary methods in accordance with one or more embodiments of the present invention.

Figure 5:
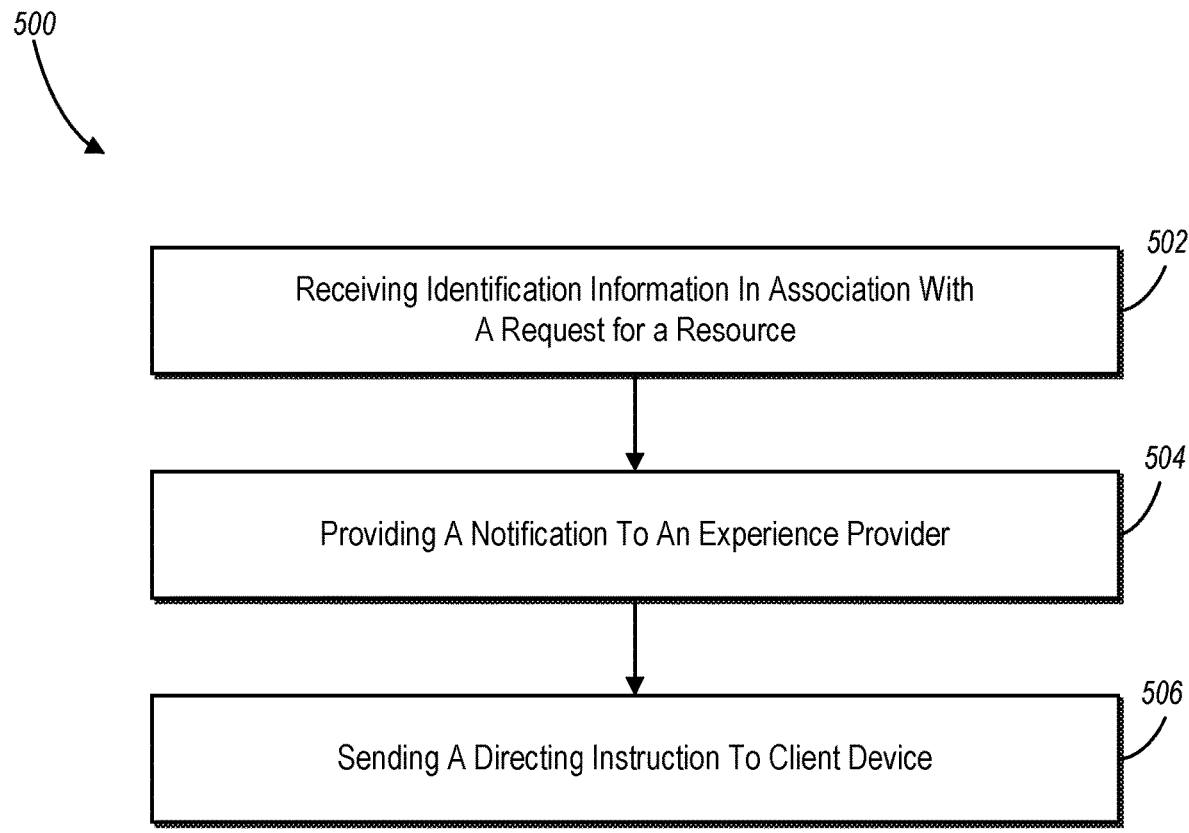
FIG. 5 illustrates a flowchart of a series of acts in a method of obtaining information for a future visitor in accordance with one or more embodiments.
Figure 6:
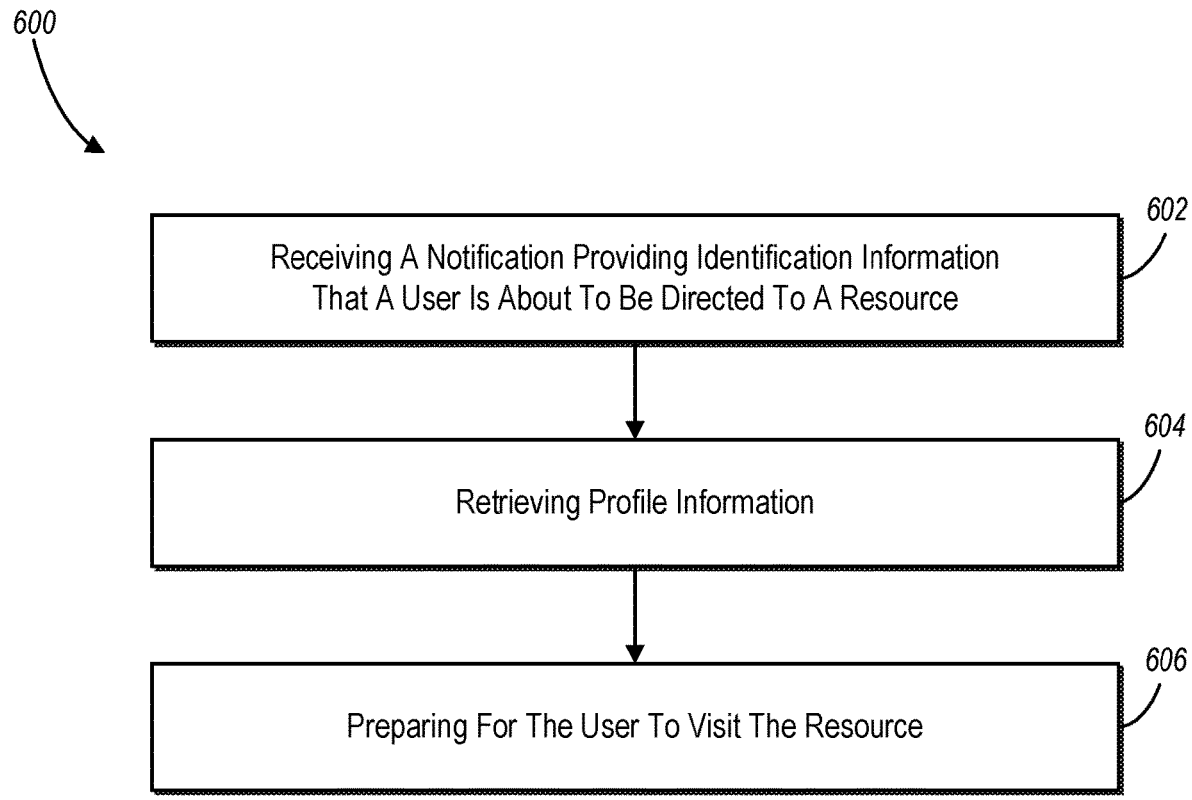
FIG. 6 illustrates a flowchart of a series of acts in another method of obtaining information for a future visitor in accordance with one or more embodiments.

FIG. 5 illustrates a flowchart of a series of acts in a method 500 of providing information for future visitors in accordance with one or more embodiments of the present invention. The method 500 includes an act 502 of receiving identification information 210, 410 in association with a request for a resource 111. More specifically, act 502 involves receiving, from a client device 108, identification information 210, 410 in association with a request 220 for a resource 111 to be provided by an experience provider 103.

In one or more embodiments, act 502 can also involve embedding a pixel tag in the advertisement that causes a call to a server associated with the experience provider 103 upon rendering of an advertisement by the client device 108. The notification 212, 310, 414 can include the call to the server. In some embodiments, the identification information 210, 410 can include a cookie stored on the client device 108 that is sent to the server associated with the experience provider 103 in connection with the call to the server.

In an alternative embodiment, act 502 can involve embedding a script in code for the advertisement that causes the client device 108 to call a server associated with the experience provider 103 upon selection of the advertisement by the client device 108. The script can cause a pixel tag associated with the server to activate upon selection of the advertisement.

As part of act 502, or as an additional act, the method 500 can include determining a uniform resource locator for the resource 111 in response to receiving the identification information 210, 410. The method 500 can also include adding a unique identifier 213 to the uniform resource locator based on the identification information 210, 410. The method 500 can also include redirecting the client device 108 to the resource 111 at the uniform resource locator having the unique identifier 213.

The method 500 also includes an act 504 of providing a notification 212, 310, 414 to an experience provider 103. In particular, act 504 involves providing a notification 212, 310, 414 that indicates to the experience provider 103 that a user associated with the identification information 210, 410 is about to be directed to a resource 111 provided by the experience provider 103.

As part of act 504, or as an additional act, the method 500 can include receiving, from the experience provider 103, a request for the identification information 210, 410 in response to the notification 212, 310, 414. The method 500 can also include providing the identification information 210, 410 to the experience provider 103 before redirecting the client device 108 to the resource 111 associated with the experience provider 103.

Additionally, the method 500 includes an act 506 of sending a directing instruction to the client device. Specifically, act 506 involves sending a directing instruction 218 that causes the client device 108 to navigate to the resource 111. For example, the resource 111 can include a website presenting the experience to the client device 108.

FIG. 6 illustrates a flowchart of a series of acts in a method 600 of obtaining information for a future visitor in accordance with one or more embodiments of the present invention. The method 600 includes an act 602 of receiving a notification 212, 310, 414 providing identification information 210, 410 that a user 104 is about to be directed to a resource 111. More specifically, act 602 involves receiving a notification 212, 310, 414 providing identification information 210, 410 corresponding to a client device 108, wherein the notification 212, 310, 414 indicates that the client device 202 is about to be redirected to a resource 111. For example, the identification information 210, 410 can include a cookie.

The method 600 also includes an act 604 of retrieving profile information 136. In particular, act 604 involves retrieving profile information 136 associated with the client device 108 based on the identification information 210, 410 prior to the client device 108 being directed to the resource 111. In one example, act 604 can involve retrieving the profile information 136a from a remote origin server. The profile information 136a can then be stored in a local storage location.

As part of act 604, or as an additional act, the method 600 can include making a call to a server requesting the profile information 136 using the identification information 210, 410. The method 600 can also include acts of receiving, from the client device 108, a request for the resource 111 in the form of a uniform resource locator, identifying the identification information 210, 410 in the uniform resource locator, and identifying the retrieved profile information 208 corresponding to the client device 108 using the identification information 210, 410.

The method 600 also includes an act 606 of preparing for the user 104 to visit the resource 111. Specifically, act 606 involves preparing a customized experience 216 for the resource 111 using the profile information 136. For example, act 606 can involve generating the customized experience 216 prior to the client device 108 being redirected to the resource 111.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code. Although the subject matter has been described in language specific to structural features or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
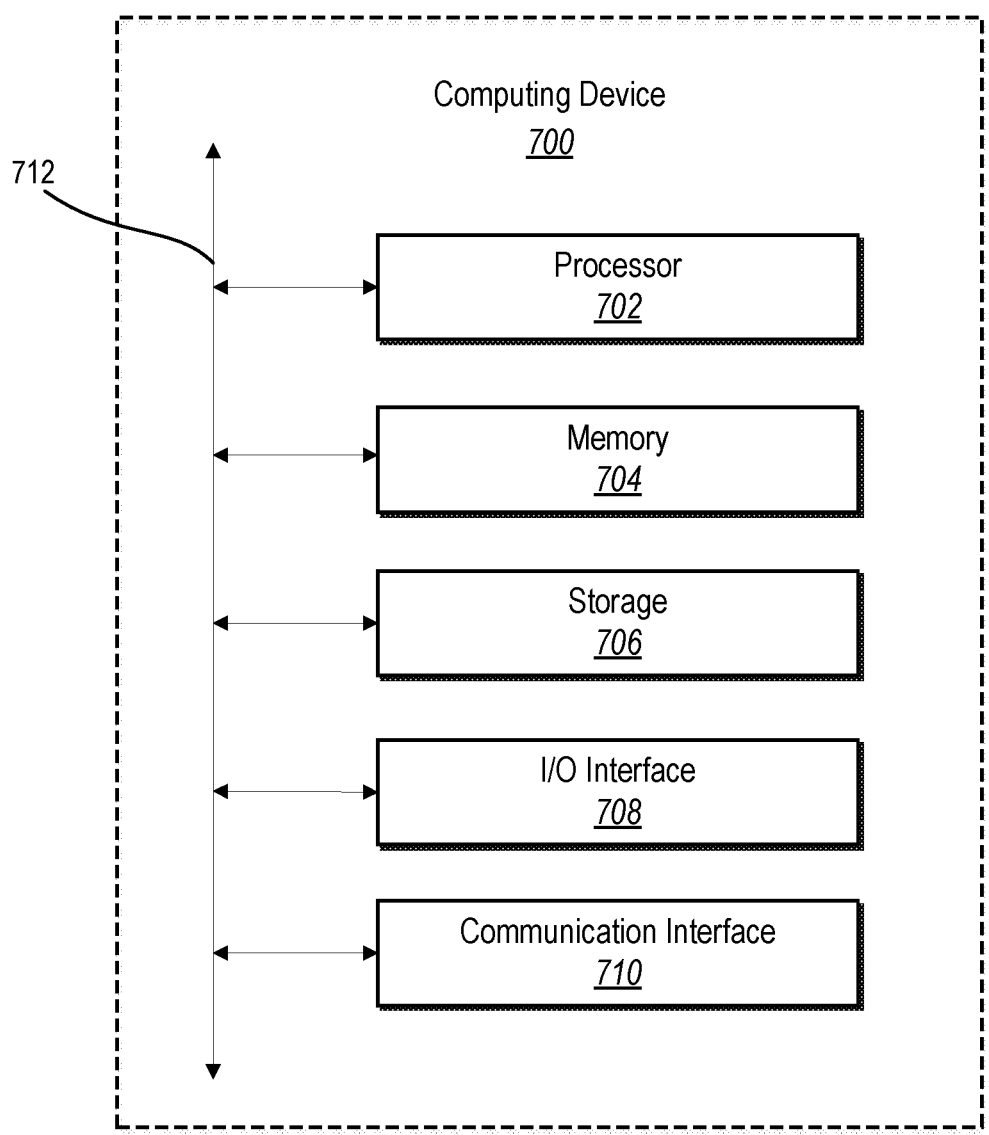
FIG. 7 illustrates a block diagram of an exemplary computing device in accordance with one or more embodiments.

FIG. 7 illustrates a block diagram of an exemplary computing device that may be configured to perform one or more of the processes described above. One will appreciate that the client device 108 and server computing devices 102, 134 can comprise implementations of the computing device 700. As shown by FIG. 7, the computing device can comprise a processor 702, memory 704, a storage device 706, an I/O interface 708, and a communication interface 710. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them. In particular embodiments, processor(s) 702 may include one or more internal caches for data, instructions, or addresses. As an example and not by way of limitation, processor(s) 702 may include one or more instruction caches, one or more data caches, and one or more translation lookaside buffers (TLBs). Instructions in the instruction caches may be copies of instructions in memory 704 or storage 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In particular embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 700 also includes one or more input or output ("I/O") devices/interfaces 708, which are provided to allow a user to provide input to (such as user strokes), receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 710. As an example and not by way of limitation, computing device 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 700 may include any suitable communication interface 710 for any of these networks, where appropriate.

The computing device 700 can further include a bus 712. The bus 712 can comprise hardware, software, or both that couples components of computing device 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
receive a notification comprising a unique identifier and identification information corresponding to a user, wherein the notification indicates that a client device is about to be redirected away from a first web page displaying an advertisement to a second web page hosted by the computing device, wherein the notification is received prior to a request by the client device to navigate to the second web page within a web browser of the client device reaching the computing device;
in response to the notification, retrieve profile information associated with the user based on the identification information prior to the client device of the user being redirected to the second web page;
customize the second web page for the user based on the profile information;
receive a request for the second web page from the client device, the request including the unique identifier; and
provide the customized second web page to the client device in response to the request.

2. The non-transitory computer-readable storage medium as recited in claim 1, wherein the instructions, when executed by the at least one processor, cause the computing device to customize the second web page by customizing functionality of the second web page based on the profile information.

3. The non-transitory computer-readable storage medium as recited in claim 1, wherein the instructions, when executed by the at least one processor, cause the computing device to customize retrieve the profile information by retrieving profile information from a remote server.

4. The non-transitory computer-readable storage medium as recited in claim 3, wherein:
the identification information comprises a cookie; and
retrieving, from the remote server, the profile information comprises retrieving a user profile associated with the cookie.

5. The non-transitory computer-readable storage medium as recited in claim 3, wherein retrieving the profile information comprises making a server call requesting the profile information using the identification information.

6. The non-transitory computer-readable storage medium as recited in claim 1, wherein the instructions, when executed by the at least one processor, cause the computing device to customize the second web page by selecting content to include in the second web page based on the profile information.

7. The non-transitory computer-readable storage medium as recited in claim 6, wherein selecting content to include in the second web page based on the profile information comprises selecting content based on one or more of a location of the client device, a sex of the user, an age of the user, preferences of the user, or past shopping or other activities of the user.

8. The non-transitory computer-readable storage medium as recited in claim 1, wherein the instructions, when executed by the at least one processor, cause the computing device to customize the second web page for the user based on the profile information prior to receiving the request for the second web page from the client device.

9. A method of obtaining information for a future visitor, comprising:
receiving, by a server, a notification comprising a unique identifier and identification information corresponding to a user, wherein the notification indicates that a client device is about to be redirected away from a first web page displaying an advertisement to a second web page hosted by the server, wherein the notification is received prior to a request by the client device to navigate to the second web page within a web browser of the client device reaching the server;
in response to the notification, retrieving, by the server, profile information associated with the user based on the identification information prior to the client device of the user being redirected to the second web page;
customizing the second web page for the user based on the profile information;
receiving a request for the second web page from the client device, the request including the unique identifier; and
providing the customized second web page to the client device in response to the request.

10. The method as recited in claim 9, wherein customizing for the second web page comprises customizing an experience for the user.

11. The method as recited in claim 10, wherein customizing the experience for the user comprises customizing functionality of the second web page based on the profile information.

12. The method as recited in claim 9, wherein retrieving the profile information comprises retrieving profile information from a remote server.

13. The method as recited in claim 12, further comprising storing the profile information in a local storage location.

14. The method as recited in claim 13, wherein:
the identification information comprises a cookie; and
retrieving, from the remote server, profile information comprises retrieving a user profile associated with the cookie.

15. The method as recited in claim 9, wherein retrieving the profile information comprises making a server call requesting the profile information using the identification information.

16. A system for prefetching information for resource customization, comprising:
a server configured to cause the system to:
receive a notification comprising a unique identifier and identification information corresponding to a user, wherein the notification indicates that a client device is about to be redirected away from a first resource displaying an advertisement to a second resource hosted by the server, wherein the notification is received prior to a request by the client device to navigate to the second resource reaching the server;
in response to the notification, retrieve profile information associated with the user based on the identification information prior to the client device of the user being redirected to the second resource;

customize the second resource for the user based on the profile information;

receive a request for the second resource from the client device after receiving the notification, the request including the unique identifier; and provide the customized second resource to the client device in response to the request.

17. The system as recited in claim 16, wherein the server is further configured to cause the system to retrieve the profile information from a remote server.

18. The system as recited in claim 17, wherein the server is further configured to store the profile information in a local storage location.

19. The system as recited in claim 17, wherein the server is further configured to customize the second resource for the user based on the profile information by customizing content for the second resource based on the profile information.

20. The system as recited in claim 19, wherein the second resource comprises a webpage.

* * * * *